United States Patent [19]
Swisher, Jr. et al.

[11] 3,970,405
[45] July 20, 1976

[54] SLIPFORM PAVING APPARATUS

[75] Inventors: George William Swisher, Jr., Oklahoma City; Donald W. Smith, Edmond; John F. Phillips, Oklahoma City, all of Okla.

[73] Assignee: CMI Corporation, Oklahoma City, Okla.

[22] Filed: May 3, 1974

[21] Appl. No.: 466,686

[52] U.S. Cl. .............................................. 404/105
[51] Int. Cl.² ........................................ E01C 19/12
[58] Field of Search ........... 404/105, 113, 102, 114, 404/83, 84, 101, 118

[56] References Cited
UNITED STATES PATENTS

| | | | |
|---|---|---|---|
| 2,054,437 | 9/1936 | Mosel | 404/105 |
| 2,245,426 | 6/1941 | Baker | 404/102 |
| 3,221,618 | 12/1965 | Hudis | 404/101 |
| 3,254,577 | 6/1966 | Guntert | 404/83 |
| 3,255,681 | 6/1966 | Heltzel | 404/101 |
| 3,257,917 | 6/1966 | Lewis | 404/105 |
| 3,354,801 | 11/1967 | Hanson | 404/105 |
| 3,423,859 | 1/1969 | Swisher | 404/84 X |
| 3,533,337 | 10/1970 | Swisher | 404/102 |
| 3,710,695 | 1/1973 | Miller | 404/98 X |

*Primary Examiner*—Nile C. Byers
*Attorney, Agent, or Firm*—Dunlap, Codding & McCarthy

[57] ABSTRACT

A slipform paving apparatus having a variable width frame assembly supported upon independently adjustable and steerable leg and track assemblies that are positionable in a paving profile or in a travelling profile. A detachable steering cable feedback and follower assembly interconnects a track assembly on one side to the respective track assembly on the other side, providing potential single side steering control. Road building implements include in sequence and in close proximity a traversing paddle assembly, a height adjustable vibrator assembly, a variable height strike-off assembly, a vibrated grout screed assembly, a profile pan assembly, and a float pan assembly cooperating with retractable slipforming means to form a finished concrete road lane upon a substrate. The implements are modularly designed so as to be capable of being parted and increased in road width building capability by the interdisposition of extension attachments between sections of each implement.

50 Claims, 43 Drawing Figures

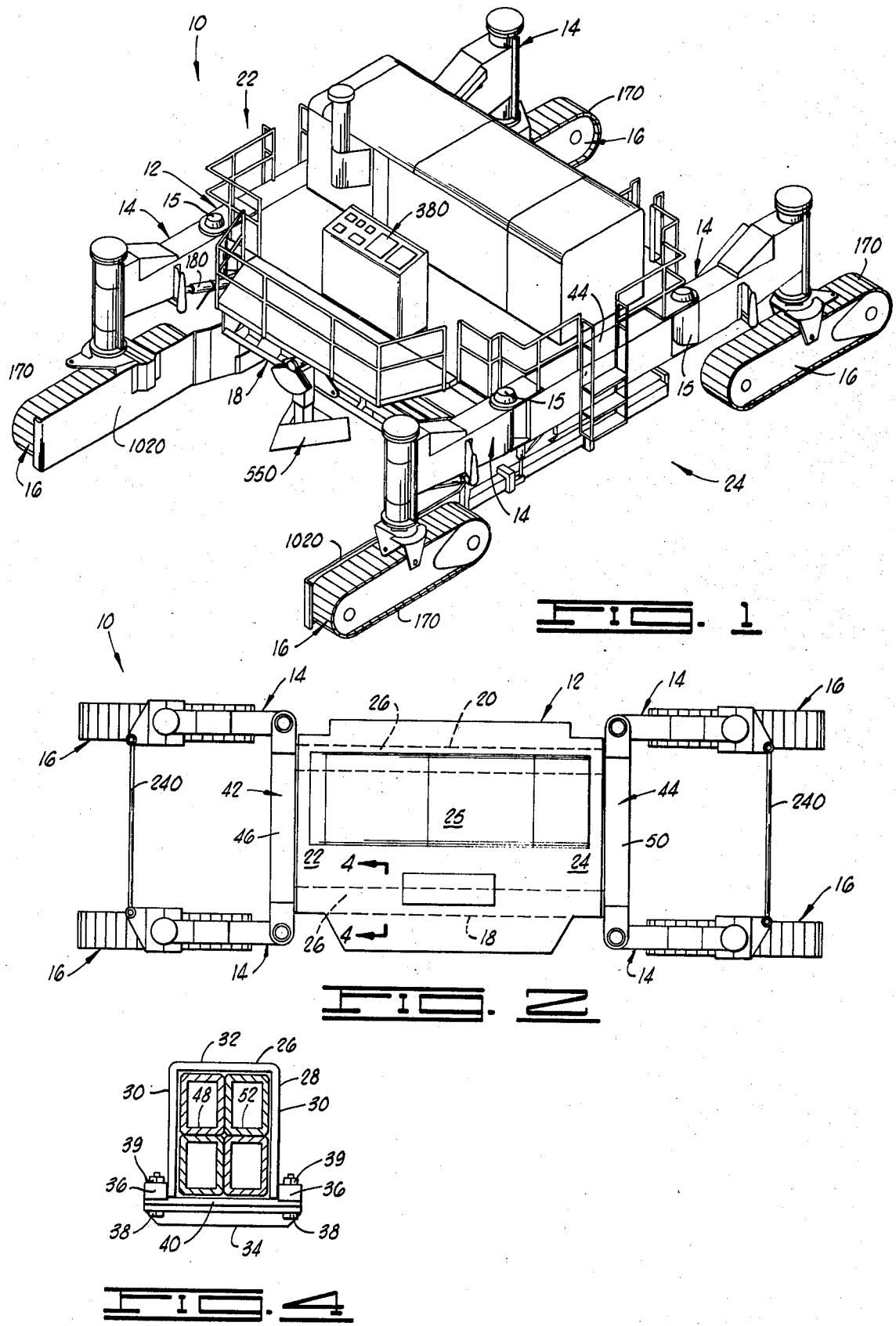

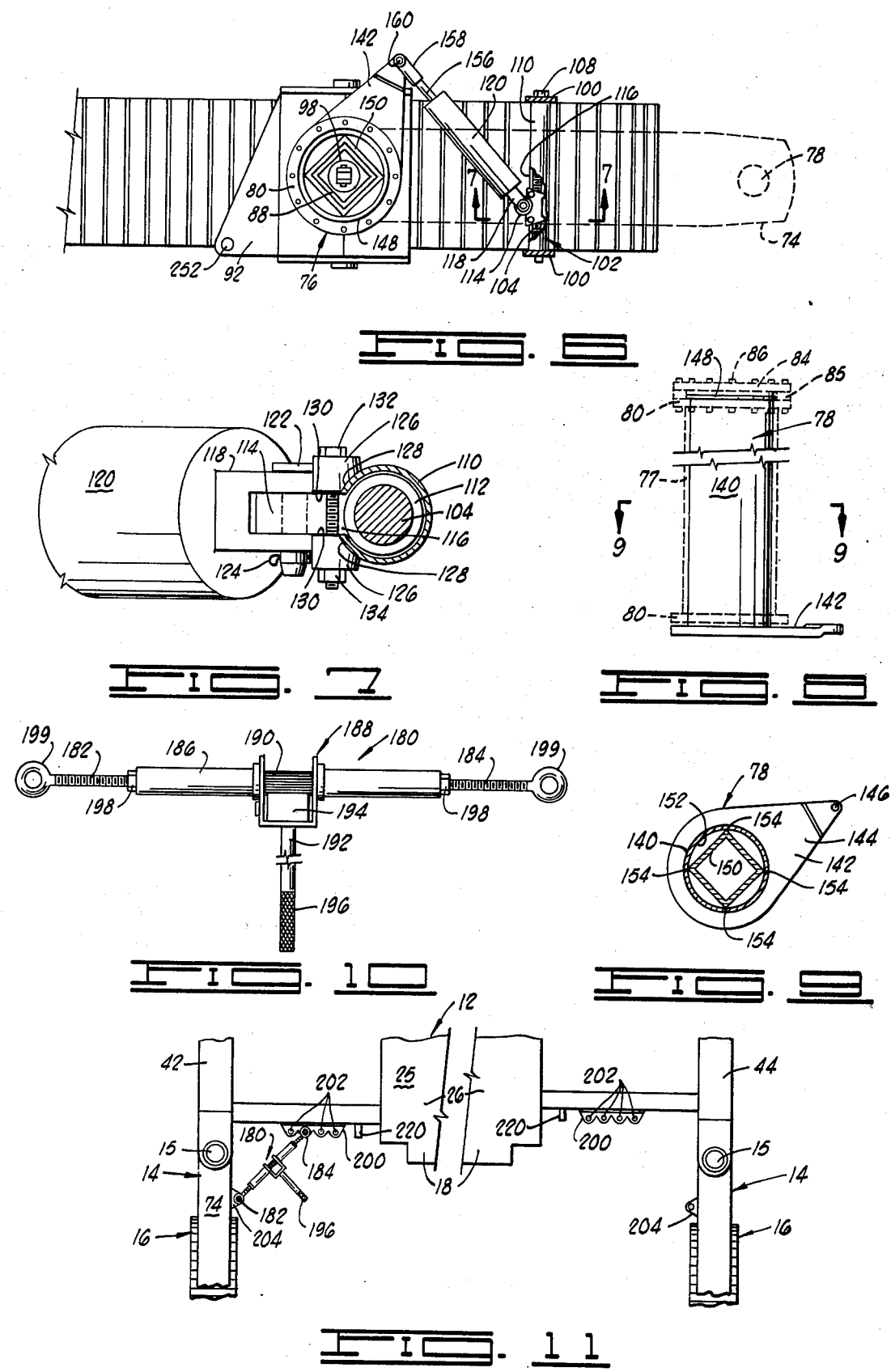

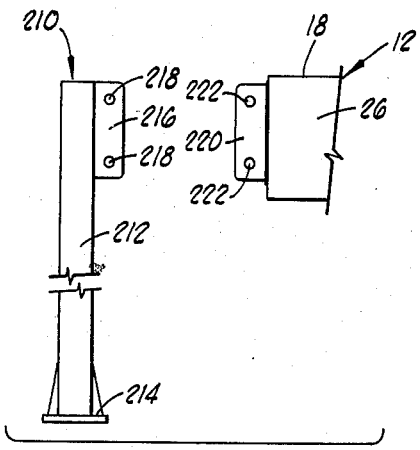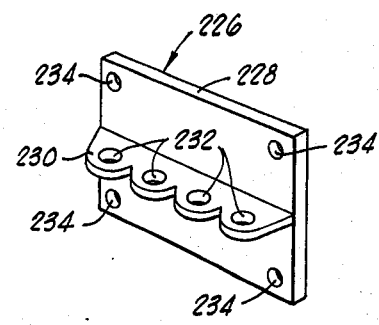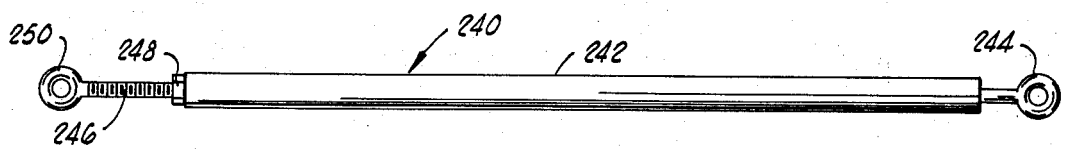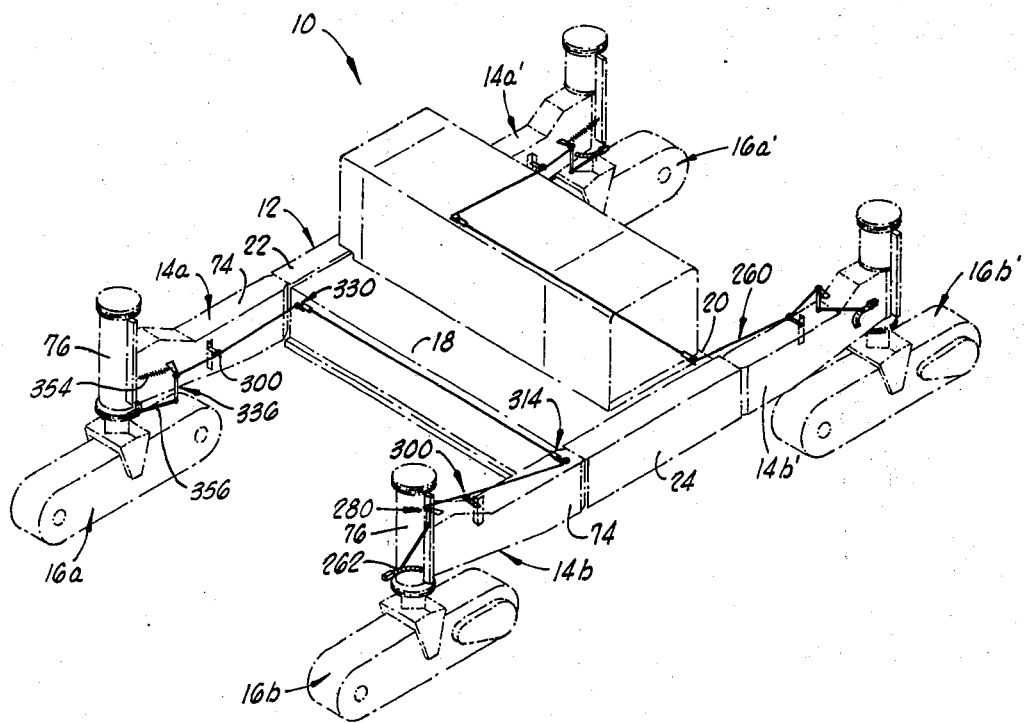

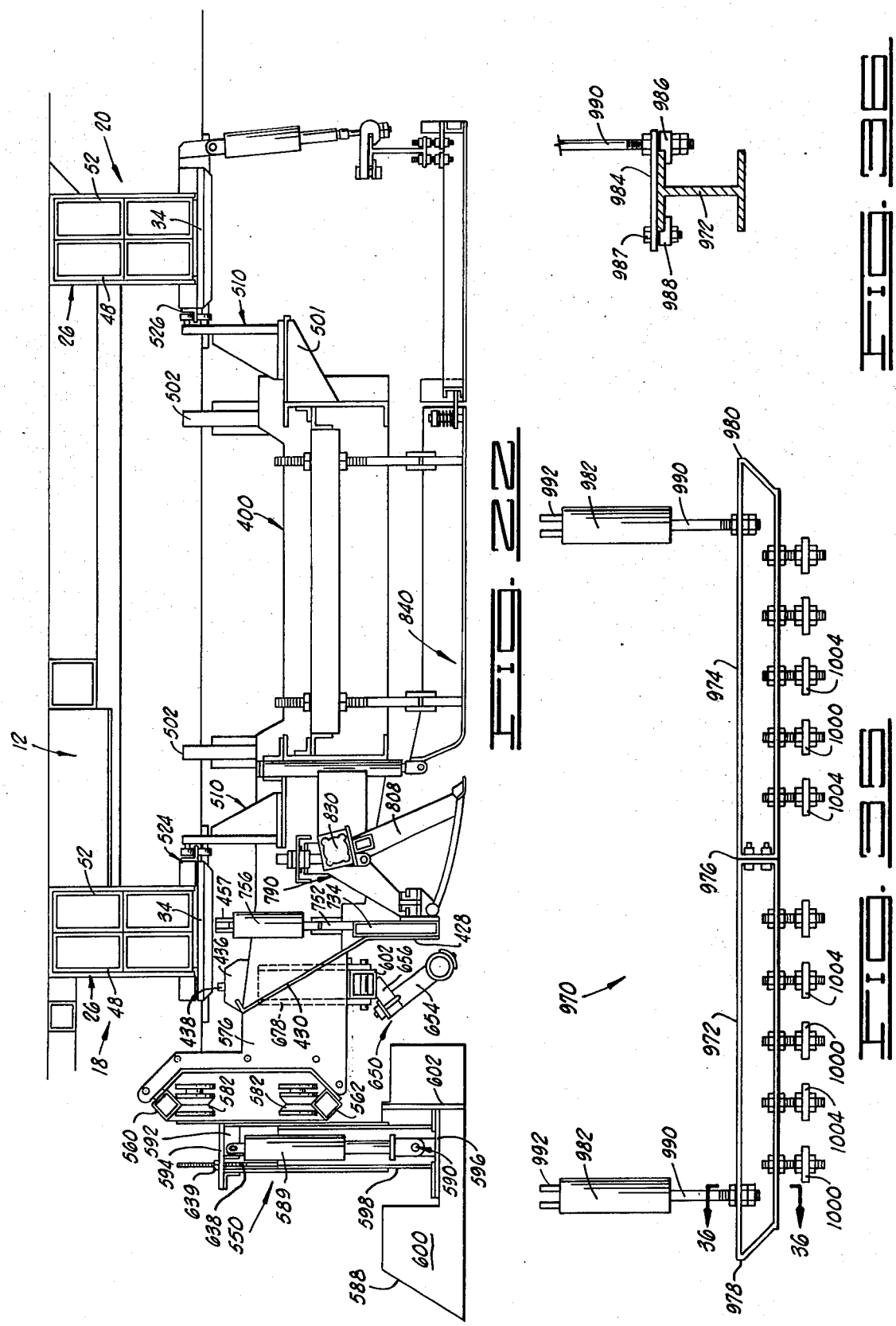

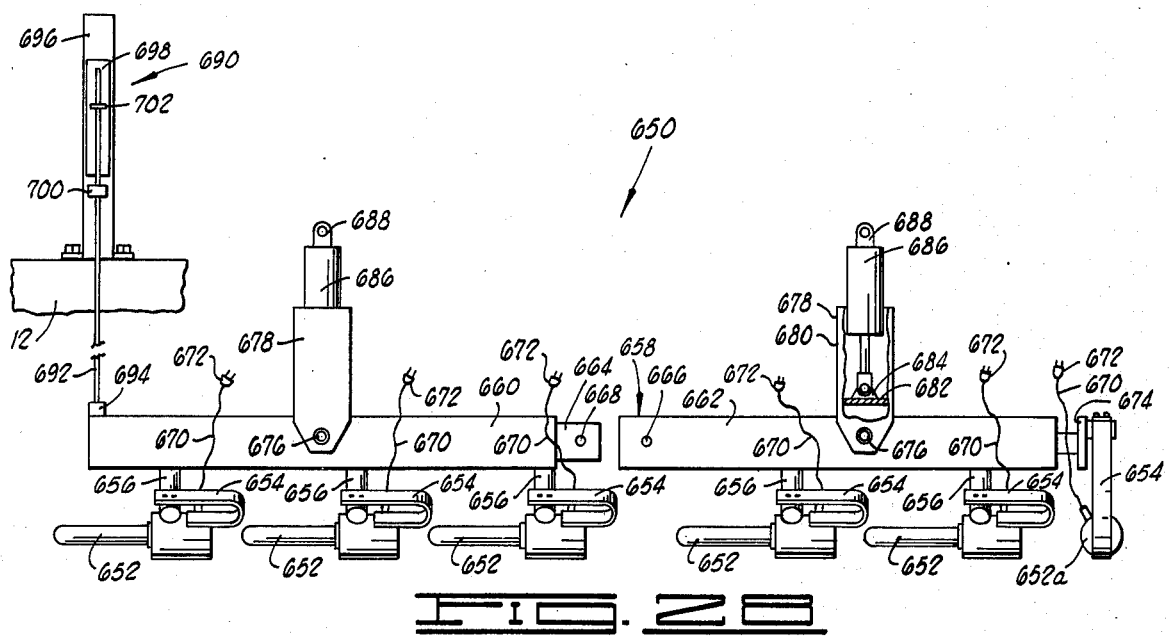
FIG. 28
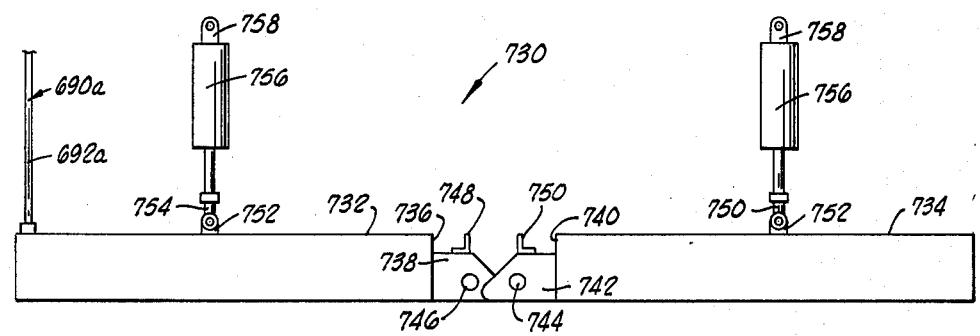
FIG. 29
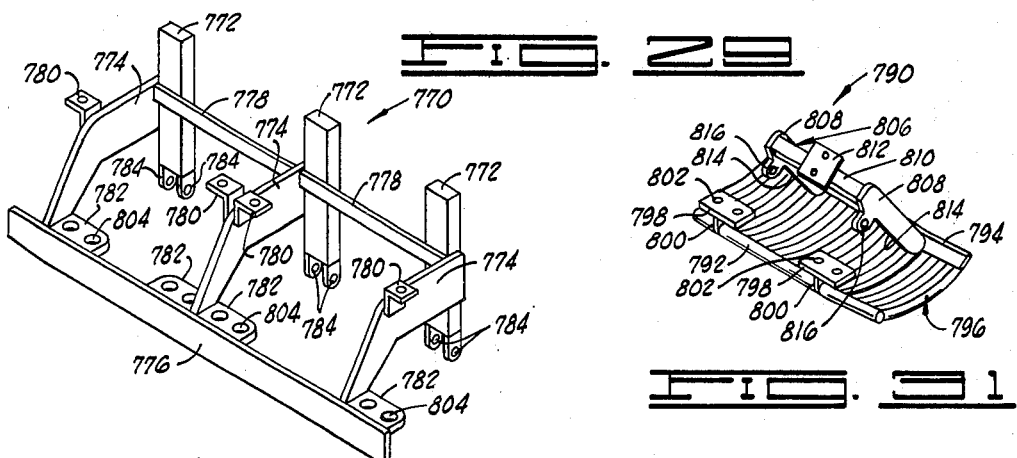
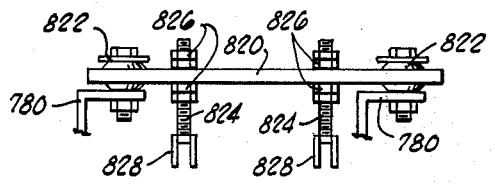
FIG. 30
FIG. 31
FIG. 32

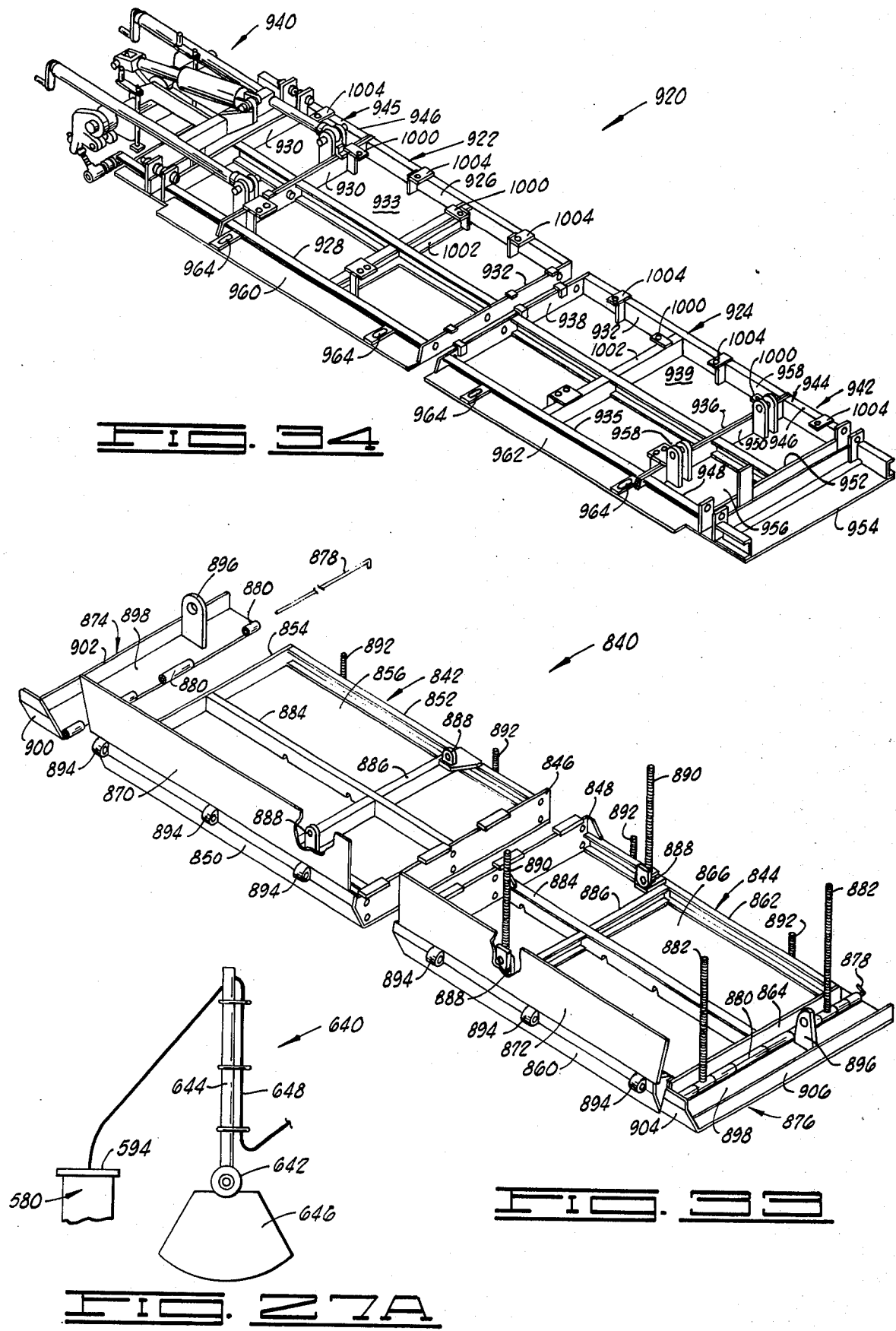

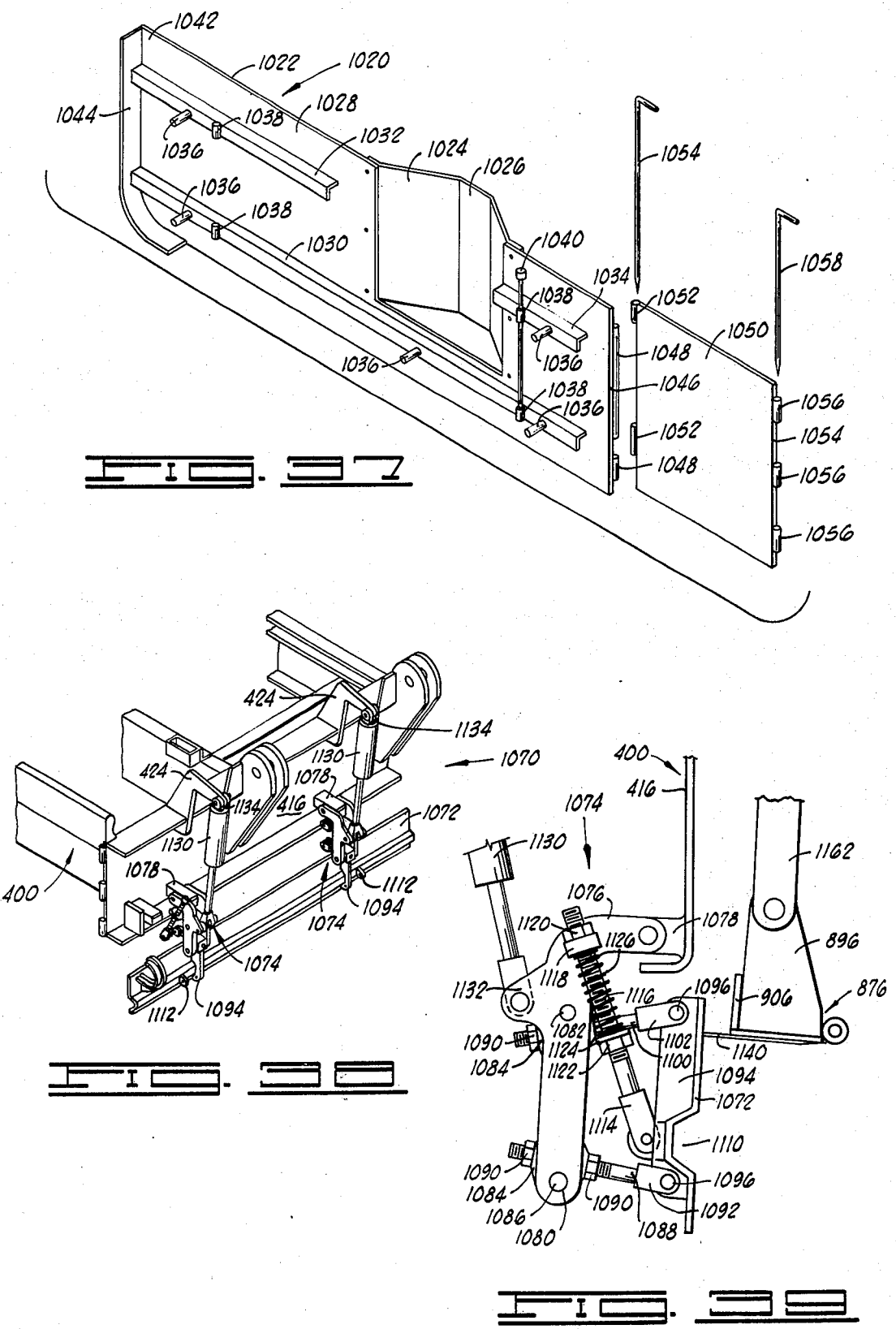

SLIPFORM PAVING APPARATUS

BACKGROUND OF THE INVENTION

1. Field of Invention

This invention relates generally to improvements in road building machines, and more particularly, but not by way of limitation, to road building machines generally referred to as slipform paving machines.

2. Description of Prior Art

The art of road building has produced many machines designed to form concrete and the like into continuous lanes of finished roads. As highway building programs have progressed, there have been many improvements in machines to pave the large number of miles of roads this country and others have constructed. Primarily, such developments have brought about machines that can be used for highway construction where the goal generally is economy of operation in building acceptible roads at a relatively rapid rate along prepared roadbed surfaces.

Slipform paving machines of prior art design have performed with varying degrees of success toward this goal. Such machines of necessity have often been extremely large and cumbersome, requiring a relatively large amount of time to set up for a given road construction job. When transferring a paving machine from one job site to another, much time and effort must be expended to prepare the machine for transport, and then usually there is need to use several vehicles to transport the machine which has been broken down into several large component parts. Upon arrival at the new job site, the set-up of the machine is repeated wherein a large amount of time and effort must again be expended. Often this process has required several days to complete a break down at the old job site and a set-up at the new job site.

As more and more short run roads have been built, the need has arisen to provide a road building machine that offers versatility of operation so that it can be used on one job site, prepared for transportation, transported to a new job site and set up at the new job site with a minimum expenditure of time and effort. Since it is customary that such machines are transported over the road system which they have helped build, a desirable attribute would be the capability of remaining intact for transporting over road systems and the like that have a maximum allowable width.

Another desirable attribute of a machine to be used on short run roads is that it is capable of use on highway systems as well, and it should be capable of laying down roads varying between the narrow roads of a suburb and the very wide lanes of super highways and the like. That is, the machine should be capable of performing on a large variety of job sites, and not merely on small road systems.

A problem that has been faced in slipform paving machines is the large amount of power required by such machines to literally bulldoze their way through the bulk concrete material that is placed in front of the machine for form working. Slipform paving machines must spread and form the concrete mix by extruding it through pressure plates provided on the top and sides of the concrete, generally using the weight of the machine to provide the force required to form the mix into a finished concrete road. It has been found in practice that the bulk of the concrete mix in front of the machine presents a formidable mass for the machine to confront, spread and work. Further slipform pavers have required massive frameworks in order to provide enough weight as applied to the extrusion plates to work the concrete mix. This has been compounded by the stiffer mixes of concrete that have been developed in recent years, and are presently still developing. To drive these large machines, large power plants have been required and economy of operation has accordingly suffered, and in addition, the quality of road surfaces has often been less than desired. Means reducing power and size requirements of slipform pavers, while improving road quality, have been needed.

In the building of short run roads, such as are often found in housing development areas, a variety of roadbed conditions is often encountered. That is, contrary to the generally spacious roadbeds found in the production of highway systems, short run roads often present the problems of tight space conditions wherein a slipform paving machine must operate in a minimum of space, even to the extremes of placing its wheels or other motive means into ditches or over banks and other obstacle type or surfaces. These conditions have prevented most prior art pavers from being used, although the advantages obtained by their use would have been apparent. Therefore, a slipform paver capable of building paved roads in restricted space conditions and capable of operating over many conditions of terrain has been needed.

SUMMARY OF INVENTION

An object of the present invention is the provision of a slipform paving apparatus that is rapidly and readily converted from a paving profile to a profile for transporting intact over highways and the like wherein a maximum dimension is permitted for passing thereover.

Another object of the present invention is the provision of a slipform paving apparatus that is capable of being steered along a path by external steering reference inputs and that is convertable to a travelling profile for transporting without disturbing the steering control set-up.

Another object of the present invention is to provide a slipform paving apparatus that provides for the construction of a concrete road having superior surface characteristics.

Another object of the present invention is the provision of a slipform paving apparatus that can be adjusted to produce a large variety of concrete road dimensions while being operable over irregular support terrain.

Another object of the present invention is the provision of a slipform paving apparatus that requires a minimum of set-up and tear down time while capable of producing roads having width and thickness dimensions variable over a large range of values.

Another object of the present invention is the provision of a slipform paving apparatus that requires a minimum of motive power and machine weight while capable of producing roads having width and thickness dimensions variable over a large range of values.

Another object of the present invention is the provision of a slipform paving apparatus that requires a minimum in maintenance and operating expenses while capable of producing roads having width and thickness dimensions variable over a large range of values.

BRIEF DESCRIPTION OF THE DRAWINGS

FIG. 1 is an isometric, semi-detailed view of the road machine of the present invention.

FIG. 2 is a diagrammatical plan view of the road machine of the present invention in its travelling profile.

FIG. 4 is a detailed view taken at section 4—4 in FIG. 2.

FIG. 6 is a plan view of the track assembly and the vertical cylinder mechanism of the present invention.

FIG. 7 is a view of the sectional detail taken at 7—7 in FIG. 6.

FIG. 8 is a view showing the inner vertical cylinder assembly of the present invention.

FIG. 9 shows a sectional view taken at 9—9 at FIG. 8.

FIG. 10 is a view of the leg jacks used to stabilize the leg assemblies of the road machine of the present invention.

FIG. 11 is a semi-detailed plan view of the road machine of the present invention showing the placement of a leg jack.

FIG. 12 shows a stationary jack used with the road machine of the present invention.

FIG. 13 is an isometric view of the connector to which the jack of FIG. 10 attaches to the frame assembly.

FIG. 14 is a view of the locking strut used to stabilize the track assemblies when the road machine of the present invention is in the travelling profile as shown in FIG. 2.

FIG. 15 is an isometric, semi-diagrammatical view of the road machine of the present invention in which the steering cable assemblies are shown.

FIG. 22 is a semi-detailed, semi-diagrammatical side view of the working implements carried by the road building machine of the present invention.

FIG. 27a is a view of the pendulum assembly that supports the hydraulic hoses leading to the paddle assembly.

FIG. 28 is a view of the vibrator assembly carried by the road machine of the present invention.

FIG. 29 is a view of the strike-off assembly carried by the frame assembly.

FIG. 30 is an isometric view of one of the tow bar frames carried by the frame assembly.

FIG. 31 is an isometric view of one section of the grout screed carried by the frame assembly.

FIG. 32 shows a view of the mounting plate and vibration mounts that are connected to the grout screed of FIG. 31.

FIG. 33 is an isometric, semi-cut-away, semi-detailed view of the profile pan assembly.

FIG. 34 is an isometric, semi-detailed view of the float pan assembly.

FIG. 35 is a view of the hanger assembly that connects to the back end of the float pan assembly of FIG. 34.

FIG. 36 is a sectional view taken at 36—36 in FIG. 35.

FIG. 37 is an isometric view of one of the track shields that attaches to the forward track assemblies of the road building machine of the present invention.

FIG. 38 is an isometric, semi-detailed view of the side form assembly of the present invention.

FIG. 29 is a detailed side view of the side form assembly shown in FIG. 38.

DESCRIPTION OF THE PREFERRED EMBODIMENT

Figure 3:
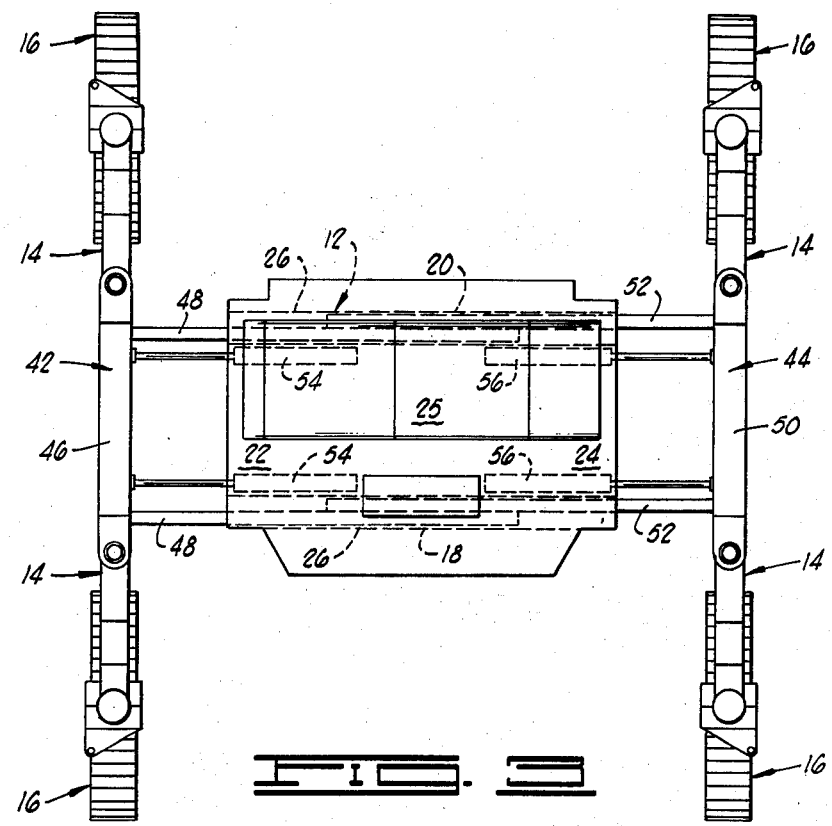
FIG. 3 is a diagrammatical plan view of the present invention set up in its paving profile.

Referring in detail to the drawings, and in particular to FIG. 1, 10 indicates generally a road machine embodying the features of the present invention. The machine 10 is basically one which carries its own slipforms and is generally referred to as a slipform paving machine. Machine 10 comprises frame assembly 12 that carries the working implements and the motive means of the machine, as will be described in detail below. Disposed at each of the four corners of the frame assembly 12 are leg assemblies 14 that extend therefrom and are connected at horizontal pivot points 15. Connected to the outer ends of the leg assemblies 14 are hydraulic motor-driven track assemblies 16 which support the frame assembly 12 and leg assemblies 14 on the ground. The track assemblies 16 are horizontally pivotable relative to the leg assemblies 14, the structural connection of which will be discussed more specifically below.

The pivoting relationship established between the leg assemblies 14 and the frame assembly 12 permits the leg assemblies to assume variable positions relative to the frame 12, the usual of which positions are shown in diagrammatical plan view in FIGS. 2 and 3. In Figure the forward end of frame 12 is designated 18 and the rear end of frame 12 is designated 20. These portions of the frame 12 are established relative to the forward direction of the machine 10 when it is in its paving profile. The sides of the frame 12 are arbitrarily designated 22 and 24 for the purpose of discussion only.

FIG. 2 is a digrammatical plan view of the machine 10 with its leg assemblies 14 extending respectively from the sides 22 and 24 of the frame assembly 12. The track assemblies 16 are aligned to further extend from the leg assemblies 14 in directions coincident with the directions of extension of the leg assemblies 14 from the main frame 12. The position of the leg assemblies 14 and the track assemblies 16 as depicted in FIG. 2 represents the traveling profile of the road machine 10, as it is readily apparent that this is the profile in which the machine assumes the narrowest outside dimensions. It will of course be understood that the purpose of this is to minimize the width of the machine while moving in a direction parallel with the extensions of the leg assemblies 14 and the track assemblies 16. In practice the dimensions of the road machine 10 are established so that the width of the machine when in its traveling profile as shown in FIG. 2 will be equal to or less than the maximum allowable width of a traveling vehicle on a highway. The tracks 16 are driven by power means to be described below and are able to move the machine 10 while in the traveling profile of FIG. 2.

The machine 10 is shown in its paving profile in FIGS. 1 and 3 with the leg assemblies 14 extending forward from the forward end 18 and rearward from the rear end 20 respectively. One of the features of the machine 10 is its ability to adjust the width of the paving lane which it is constructing on the roadbed over which it travels. The machine 10 is constructed so as to be able to extend the leg assemblies 14 and the track assemblies 16 from the respective sides 22 and 24 in the manner as depicted in FIG. 3. This is achieved in the following manner.

At the forward end of frame assembly 12 and extending the width of the frame assembly 12 is a tubular member 26. Another tubular member 26 is found extending the width of frame assembly 12 at the rear end 20. The tubular members 26 are identical, and a cross section of one of these members is shown in FIG. 4 as taken at 4—4 in FIG. 2. As can be seen thereat, tubular member 26 is comprised of a U-shaped channel 28 having a pair of side walls 30 and a top wall 32. Disposed at the open end of the channel, which is opposite to the top wall 32, is a pressure plate 34. Affixed to the side walls 30 are members 36 which are apertured to align with corresponding apertures in the pressure plate 34. These aligning apertures receive bolts 38 which are threadingly engaged with locking nuts 39. For convenience, the nuts 39 may be spot welded to the members 36. Disposed between the pressure plate 34 and the tubular member 26 is an elastomeric compression plate 40.

It will be understood that the pressure plate 34 is a linear plate extending along the tubular member 26 and is secured at numerous points to the members 36 by a plurality of bolts 38 and nuts 39.

Returning to FIGS. 2 and 3, the frame assembly 12 comprises a center frame section 25 and a pair of extensible side members 42 and 44 disposed respectively at the sides 22 and 24 of the frame assembly 12. Side members 42 and 44 are shown in FIG. 2 in the contracted profile and in FIG. 3 in an extended profile. Extensible side member 42 comprises cross member 46 which has a pair of extending strut members 48 that are slidingly receivable in the tubular members 26. In a like manner, side member 44 comprises cross member 50 which is connected to a pair of extending strut members 52 that are slidingly receivable by tubular members 26. Each of the extending strut members 48 and 52 comprises a pair of square beams weldingly stacked so as to form a relatively narrow but very strong strut member to hold the weight of the machine 10. The cross section 4—4 taken in FIG. 2 and shown as FIG. 4 shows the side by side relationship that the extending strut members 48 and 52 assume within the tubular member 26. The strut members 48 and 52 are compressingly held within the tubular members 26 by the pressure plate 34 which is tightened against the compression plate 40 by tightening the bolts 38 and the nuts 39. Conversely, by relieving the pressure on the strut members 48 and 52, that is by loosening the bolts 38 in the nuts 39, the strut members 48 and 52 may freely slide in side by side relationship within the tubular members 26.

A pair of hydraulic rams 54 are disposed on the underside of the frame assembly 12 and are connected to the center frame 25 at side 22 and to the cross member 46. By pressurizing these hydraulic rams 54 by conventional hydraulic valving means, their respective rams extend to push the cross member 46 to its extended position depicted in FIG. 3 or conversely, by contracting the hydraulic rams 54, pull the cross member 46 to an adjacent position to the side 22 of the frame assembly 12 as shown in FIG. 2. In like manner, cross member 50 is connected to a pair of hydraulic rams 56 disposed on the underside of the frame assembly 12 at side 24 for the purpose of extending or contracting the cross member 50, also shown in the contracted position in FIG. 2 and the extended position in FIG. 3. Of course, it will be necessary that the extending strut members 48, 52 be partially freed of the weight of the machine 10 in order that the hydraulic rams 54, 56 will be able to contract or extend as is their purpose. One method of achieving this is to have the leg assemblies 14 and the track assemblies 16 in the travelling profile depicted in FIG. 2, and to use the power means to drive the track assemblies in unison cooperatively with the hydraulic rams 54 and 56 to effect contraction and extension. Another method is that of propping the machine 10 on weight bearing struts will be described in detail below.

Figure 5:
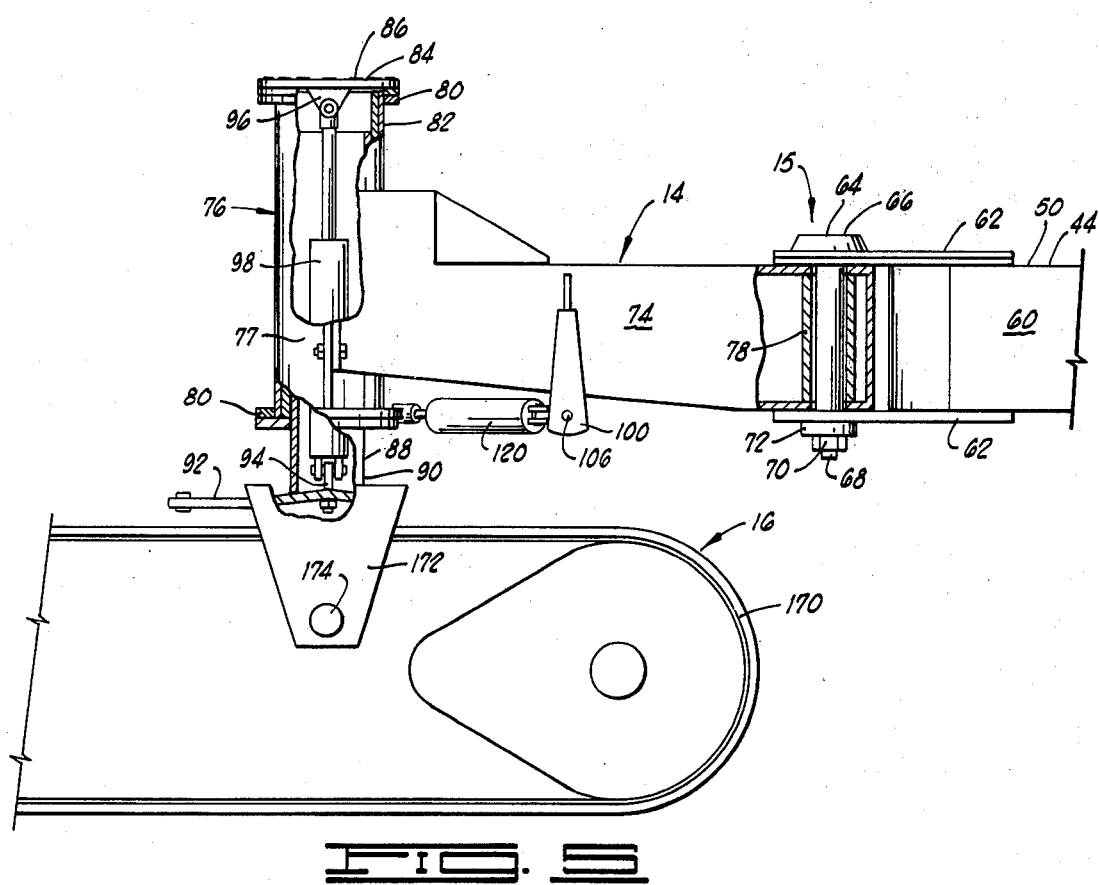
FIG. 5 is a partial cut-away view showing the details of construction of the leg and track assemblies of the present invention.

Continuing now with the leg assembly 14, FIG. 5 shows the attachment of leg 14 in partial cut-away cross section. It will be understood that FIG. 5 is typical of all of the leg assemblies 14 and, for illustration purposes only, shown therein is the attachment of the leg assembly to cross member 46. As discussed above, side member 42 comprises cross member 46 which has a structural elongated box member 60 which has welded to each end thereof a pair of parallel extending plates 62. The plates 62 have aligned apertures that receive the leg pin 64 which has an enlarged head 66 and a threaded end 68. When the leg pin 64 is placed to pass through the apertures in plates 62 in the manner shown in FIG. 5, a nut 70 is threadingly engaged with the threaded portion 68, a spacer 72 first being disposed between the nut 70 and the lower plate 62 as shown.

The leg assembly 14 comprises a leg member 74 connected to a vertical cylinder member 76. The leg member 74 has a aperture 75 extending therethrough clearingly receiving the leg pin 64 when placed therethrough. The dimension of leg 74 is established so as to be clearingly receivable between the parallel plates 62 extending from side member 42. Aperture 75 is aligned with the apertures in the plates 62 and the leg pin 64 pivotally connects leg member 74 to side member 42 in the manner shown in FIG. 5 and described above for placement of the leg pin 64.

The vertical cylinder member 76 comprises an outer cylinder 77 and an inner vertical cylinder assembly 78 which will be discussed more fully below. Cylinder 76 has a flange member 80 welded each of its ends. At the upper end 82 of the vertical cylinder member 76 is disposed a blind flange 84. As will be understood, a plurality of apertures in the flange member 80 and the blind flange 84 align in a manner to receive a plurality of bolts and accompanying nuts 86 to secure blind flange 84 to flange member 80.

As shown in FIG. 5, each track assembly 16 comprises a vertical extending member 88 that is slidingly receivable in the vertical inner cylinder assembly 78. That is, the external dimensions of the vertical member 88 are established to be closely but clearingly received by the internal dimensions of the vertical cylinder assembly 78. This not only permits sliding relationship of the vertical member 88 to the vertical cylinder member 75, but also permits the vertical extending member 88 to pivot relative to the vertical cylinder member 76. At the lower end 90 of vertical member 88 is disposed a plate 92 welded normal to the vertical member 88. As will be clear from the plan view shown in FIG. 6, the vertical member 88 is rectangular in cross section and is hollow. Projecting from plate 92 and extending within the hollow of vertical member 88 is an apertured lug 94. In the same manner, a lug 96 is attached to and extending from blind flange 84 to extend into the approximate center and hollow of vertical cylinder member 76 as shown in the partial cut-away view in FIG. 5. Disposed within the vertical cylinder member 76 and the vertical member 88 is a hydraulic ram 98 which extends vertically along the axial center of the members as shown in FIG. 5. The hydraulic ram 98 has one end boltingly connected to lug 94 and its other end connected to lug 96 by conventional bolt means. As will be understood, valve means are provided to extend or contract the hydraulic ram 98 whereupon the vertical member 88 is slidingly positioned within the vertical cylinder member 76. All of the leg assemblies are so connected to the respective track assemblies and means are provided to expand or contract all of the rams 98 in unison or in any desired combination of the four such rams.

Turning now to a discussion of the means provided to pivot the vertical member 88 relative to the vertical cylinder member 76, FIG. 5 shows one of a pair of parallel support members 100 that are connected and extend downward from leg 74. FIG. 6 shows a plan view of a leg assembly 14 and track assembly 16, with the blind flange 84 removed from the upper end 82 of the vertical cylinder member 76, and further with the leg 74 outlined in dotted lines so as to reveal the adjustable connector 102. The connector 102 comprises screw rod 104 which spans between the support plates 100 and is bearingly fixed therebetween through appropriate apertures axially aligned in the support plates 100. Through one of the apertures 106, one end of the screw rod 104 has a bolt head 108 which when mounted by an appropriately shaped wrench affords rotation of the screw rod 104. Screw rod 104 may be viewed through the partial cut-away of its housing 110 as shown in FIG. 6, or in cross section as taken at 7—7 in FIG. 6 and shown in FIG. 7. Threadingly engaged and mounted on the screw rod 104 is traveller 112 that has a lug 114 extending therefrom through a longitudinal slot 116 that extends in a generally horizontal direction for the length of housing 110, the housing extending between support plates 100. The lug 114 is apertured and matingly connects with a clevice 118 that is attached to one end of a hydraulic ram 120, a discussion of which ram will follow. A bolt 122 having a keeper pin 124 connects the clevice 118 to the lug 114 in the manner shown in FIG. 7. A pair of oppositely facing shoes 126 are designed to be disposed on opposite sides of the lug 114 and have arcuate portions 128 that contacts and bears against housing 110, and a flat surface 130 that grippingly contacts the lug 114. Each shoe 126 has a pair of apertures in axial alignment that receive the pair of bolts 132 that is placed in the apertures and matingly tightened by the pair of lock nuts 134.

Commencing with the nuts 134 being loosened upon the bolts 132, the position of the traveller 112 on the screw rod 104 is variable and can be changed by turning the bolt head 108 in a determined direction in order to rotate the screw rod 104. Because the lug 114 extends through the slot 116, it is prevented from rotating with the screw rod 104 and thus is caused by such turning to move along the screw rod 104. As will become clear below, this changes the position of the end of the hydraulic ram 120 which is attached to the clevice 118 which is pinned to the lug 114 via bolt 122. This gives a variable push point for the hydraulic ram 120, and this point can be fixed once a desired setting is achieved in the manner described by tightening the nuts 134 on the bolts 132, which causes the shoes 126 to be forcefully engaged with both the housing 110 via the arcuate surface 128 and the lug 114 via the flat surfaces 130 pressing against the lug.

The reason for providing a variable push point for the hydraulic ram 120, as above described, is to provide the means whereby hydraulic ram 120 is centered relative to its ram position. That is, by centering its ram for a particular angular setting of the track assembly 16 to its respective leg assembly 14, the hydraulic ram 120 has an approximate equal ram travel for pivoting the track assembly in either of two rotational directions. It is apparent that extending hydraulic ram 120 turns track assembly 16 in one rotational direction, and that contracting hydraulic ram 120 turns track assembly 16 in the opposite rotational direction.

As indicated above, the vertical cylinder mechanism 76 comprises the outer vertical cylinder 77 which has been discussed in detail above, and the inner vertical cylinder assembly 78 which will now be described by reference to FIGS. 8 and 9. The inner vertical cylinder assembly 78 includes a vertical cylinder 140 whose outer diameter is clearingly but closely receivable by the inner diameter of the outer vertical cylinder 77 and extends approximately the length of the outer cylinder. The outer vertical cylinder 77 and its flange members 80 are shown in dashed lines in FIG. 8 to illustrate the relationship of the outer vertical cylinder 77 to the inner vertical cylinder 140. Secured to one end of inner vertical cylinder 140 is the torque arm 142 which is a plate extending around the bottom of and welded to inner vertical cylinder 140, and having an extending portion 144 which has an aperture 146 therethrough. At the other end of inner vertical cylinder 140 is a roll flange 148. The inner vertical cylinder 140 is positioned within the outer vertical cylinder 77 so that the torque arm 142 is adjacent to, but clear of, the lower flange member 80. The other end of inner vertical cylinder 140 projects slightly above the outer vertical cylinder 77. The roll flange 148 overlaps the flange 80 so that the weight of the inner vertical cylinder assembly 78 is carried by this roll flange against the flange member 80 connected to outer vertical cylinder 77 at end 82 as shown in FIG. 8.

A cross section of the inner vertical cylinder assembly 78 taken at 99 is shown in FIG. 9. Disposed within and extending the length of the inner vertical cylinder 140 is tubular member 150 which is secured to the inner wall 152 of inner vertical cylinder 140 at the exterior apexes 154. The tubular member 150 is approximately square in cross section as shown in FIG. 9 and is dimensioned to receive the vertical member 88 of track assembly 16 in sliding relationship therein as was mentioned in the above discussion. The cross section of tubular member 150 is preferably square and oriented so that track assembly 16 is pushing via vertical member 88 against the walls of tubular member 150, as shown in FIG. 6, regardless of the angular orientation of track assembly 16 relative to leg assembly 14. This permits the dimensions of the cross section of the vertical member 88 to vary more widely and still retain wall pressure as the track assemblies 16 propel the machine. In other words, should the dimensions of the vertical member 88 be made smaller than design optimum or after wear has caused the dimensions to be reduced, the vertical member 88 will nevertheless at all times be pushing against two of the walls of the tubular member 150. The positioning of the inner vertical cylinder assembly within the confines of the outer vertical cylinder as described above permits free rotation of the inner vertical cylinder assembly 78, and the torque arm 142 serves as a lever arm connection to pivot the assembly. The extendable rod 156 of hydraulic ram 120 is connected to 142 via the clevice connector 158 and a conventional bolt and nut arrangement 160 placed through aperture 146 in torque arm 142.

The reason for the adjustable connector 102 that is connected to one end of the hydraulic ram 120 is to provide a mechanism which will permit the use of a hydraulic ram having a reasonably short displacement of the rod 156. It will be apparent that the rotation of the track assemblies 16 can be effected without regard for the positioning of the leg assemblies, leading to the result that the turning of the track assemblies 16 is always effected from the same planar position of the hydraulic rams 120, and the adjustable connector permits a smaller hydraulic ram to effect this turning. In practice, once the orientation of the leg assemblies have been placed as will be described in more detail below, the fixed end of the hydraulic rams, those attached to the adjustable connectors 102, can be adjusted by turning the bolt heads 108 so that the hydraulic ram has displacement of the extendable rods 156 within a useful range of steering. It will be understood that appropriate valving means of conventional design is provided to control the extension or contraction of the hydraulic rams 120, and as will be clear below, the hydraulic rams 120 will serve to steer the road machine 10.

Referring once again to FIG. 5, the track assemblies 16 comprise an endless track drive 170 that is powered by conventional hydraulic drive motors that are well known in the art, and a discussion of such is not necessary for the disclosure herein. The plate attaches to the base of vertical member 88 and is normal thereto. Extending beneath the plate 92 are a pair of spaced apart, parallel plates 172 that stradle the endless track member 170 and a track axle 174 passes through appropriately placed and aligned apertures in the plates 172 and endless track members 170. The track axle 174 is retained in place by appropriate locking mechanisms such as a nut and cotter key arrangement at a threaded end thereof. This arrangement is conventional and need not be discussed in detail for the disclosure herein.

As discussed above, the leg assemblies 14 are pivotally connected at pivot points 15 to the side members 42 and 44. The travelling and paving profiles of road machine 10 are depicted in FIGS. 2 and 3 respectively, and these two profiles represent the range of pivoting that is possible utilizing the pivoting feature of the leg assemblies 14. In practice, the leg assemblies may assume any position between these two extremes, and of course, the leg assemblies must be stabilized in a fixed position for any particular usage to which the machine 10 may be put. This is achieved by use of leg jacks, one of which is shown in FIG. 1 and innumerated 180, and which is also shown in FIG. 10. The leg jack 180 is of conventional design and comprises extensible rods 182 and 184 extending from tubular body 186. Approximately in the mid point of tubular body 186 is a ratchet mechanism 188 comprising rotatable gear 190 and a rotatable handle assembly 192, the latter having a gear engaging blade 194. As will be understood, and need not be described in detail for the purpose of this disclosure, the handle assembly 192 is constructed so as to ratchetly engage and turn the gear 190 by reciprocatingly jacking the handle 196 of the handle assembly 192 manually. It is not necessary to detail the internal mechanism of the leg jack 180 except to state that the turning of gear 190 relative to tubular body 186 causes the extendable rods 182 and 184 to extend from or to be contracted into the tubular body 186. Located near the ends of tubular body 186 and threadingly engaging the threaded rods 182 and 184 are the lock nuts 198. These nuts are loosened during extending or contracting the rods 182 and 184 and are tightened against the tubular body 186 when the desired extensions of rods 182 and 184 are reached. A loop connector is integrally formed at the end of extendable rod 182 and at the end of extendable rod 184 for purposes of connection to the leg assemblies 14 and to the frame assembly 12. This is demonstrated more clearly in FIG. 11.

Located on the forward end 18 of the frame assembly 12 is a connector 200 which has several spaced apart apertures 202. There are two such connectors 200 attached to the forward end 18 of frame assembly 12 and two of the connectors 200 attached to the rear end 20 of the frame assembly 12 (not shown in the figures). Each of these is located in close proximity to the outside ends of the tubular members 26 and the leg jacks 180 are appropriately sized so as to reach from each of the apertures 202 to an apertured lug 204 on the near surface of the leg 74 to which the leg jack 180 attaches. As shown in FIG. 11, leg jack via appropriate bolting means is connected by the loop connectors 199 on extendable rod 182 to the leg 74 at the aperture lug 204, and by the loop connector 199 on extendable rod 184 to one of the apertures 202 on the connector 200 as shown in the FIG. 11. The reason for providing several apertures for connecting to connector 200 is to enable the utilization of a smaller size leg jack 180 than would be necessary if only one such aperture were provided. This will be clear following the discussion of the pivoting of the leg assemblies relative to the frame assembly 12.

The positioning of the leg assemblies 14 relative to the frame assembly 12 can be achieved by at least two methods. It is desirable that the weight distribution of the road machine 10 be reasonably distributed so that the weight is approximately supported equally by each of the track assemblies 16. The track assemblies and their connecting vertical members 88 have been described in detail above, and it will now be understood that the positioning of the frame assembly 12 vertically from the ground surface over which it travels can be varied by the manipulation of the hydraulic rams 98 that control the relative positioning of track assembly 16 to their respective vertical cylinder mechanisms 76. Conventional valving means is provided in order to extend or contract the hydraulic rams 98 to effect this positioning control. It will be understood then that by contracting only one of the hydraulic ram assemblies 98, its respective track assembly will move upward and be clear of the earth and the weight of the road machine 10 will be borne by the remaining three track assemblies 16. While the raised track assembly 16 is clear of the earth, and with its respective leg jack 180 removed, this track assembly 16 may be manually pushed to a desired position, and lowered by extending the respective hydraulic ram 98. This procedure may be repeated for each of the track assemblies 16 in singular sequence so that the positioning of the legs 16 is effected as desired. Once a particular leg assembly is in its approximate location, its leg jack 180 is connected in a manner described for FIG. 11 by first adjusting its length via the ratchet assembly 188 and bolted to the respective lug 204 on the leg assembly 14 and the appropriate aperture on the connector 200. After bolting in place, the leg jack 180 may be ratcheted by the handle 196 to give a precise pivotal location of the leg assembly 14 relative to the frame assembly 12. This may be achieved as well during the time that track assembly 16 is raised by the contraction of hydraulic rams 98. Following this, the lock nuts 198 on the extendable rods 182 and 184 of the leg jack 180 are tightened to maintain the extended position of the extendable rods 182 and 184 of leg jack 180 in order to firmly brace the leg assembly 14 in the desired pivoted location.

The above procedure for placement of the leg jacks 180 may also be achieved by the use of stationary jacks that are connectable to the connectors 220 that extend from tubular members 26 as shown in FIG. 11. FIG. 12 shows stationary jack 210 which comprises a box-framed stand 212 having a braced ground support plate 214 at one end and a connector 216 at the other end, the connector having a pair of spaced apart apertures 218 at the forward end 18 of the frame assembly 12. On the tubular member 26 is affixed a connector plate 220 which has spaced apart apertures 222 that align with the apertures 218 on the connector 216. When the road machine 10 is caused to be raised via the extensions of the hydraulic rams 98 to a height such that the connector 220 is at an appropriate distance from the earth so as to enable the attachment of the stationary jack to the frame assembly 12, this connection is made by aligning the apertures 218 and 222 and placing therethrough appropriate bolting means. As shown in FIG. 11, the connectors 220 are placed near the outer edges of the tubular members 26, with one connector 220 being placed at each of the four corners of the frame assembly 12. By the use of one or more of the stationary jacks 210, connected in the manner described, the weight of the road machine 10 may be placed on such stationary jacks by contracting the hydraulic rams 98 so as to lower the weight of the machine 10 onto the stationary jacks. This permits the pivotal placement of the leg assemblies 14 as desired. Once the desired placement has been obtained, it will be understood that the jacks 210 may be easily removed by reversing the steps above described for their attachment.

FIG. 11 depicts the side members 42 and 44 in their positions adjacent to the center frame section 25. As was discussed above, the side members 42 and 44 are extendably connected to the tubular members 26 by way of the extending strut members 48 and 52. The leg jacks 180 are used to stabilize the leg assemblies 14 in a desired pivoted location by interconnecting with connectors 200 which are permanently affixed to the tubular members 26, as shown in FIG. 11. It will be clear that the connectors 200 are taken out of reach of the leg assemblies 14 once the side members 42 and 44 are extended in the manner shown in FIG. 3. To overcome this problem, a detachable connector 226 is provided for each of the extendable struts 48 and 52. FIG. 13 shows the detachable connector 226 comprising a plate 228 which has a lug 230 extending therefrom, the lug having a plurality of holes 232 in the same manner as the connector 200. The plate 228 has four apertures 234 that serve as bolt holes. Each of the extendable struts 48 and 52 has a set of threaded apertures that align with the apertures 234 and the plate 228. When the side members 42 and 44 are to be extended by the rams 54 and 56 respectively, the leg jacks 180 are disengaged from the connectors 200, the side members 42 and 44 are extended, and one of the detachable connectors 226 is attached to each of the strut members 48 and 52 via appropriate threaded bolt means through the apertures 234. Following this, the connectors 226 serve the same purpose as described above for the connectors 200. Of course, these connectors 226 must be removed prior to contracting the side members 42 and 44 because of the clearance requirements of the sliding struts in the tubular members 26.

One of the features of the present invention, as described above, is that the road machine 10 may be placed in a travelling profile as depicted in FIG. 2 whereupon its overall width is maintainable under the maximum allowable width for travelling on highways and the like. To stabilize the leg assemblies 14 when in the travelling profile, a locking strut 240 as shown in FIG. 14 is used to connect to and stabilize the track assembly 16 in the manner shown in FIG. 2. The locking strut 240 comprises an elongated bar 242 that has an integrally formed apertured connector 244 at one end thereof, and has a threaded bore at the other end. Matingly received within the threaded bore 240 is connector rod 246 which contains a locking nut threadingly engaged therewith for pressure abutment against the bar 242. Integrally formed at one end of connector rod 246 is an apertured connector 250. Returning to FIG. 6, the plate 92 at the base of the vertical member 88 has an aperture 252 therein. These apertures 252 are placed in each of the plates 92 on the track assemblies 16 so as to lie on the inside edges of the plates when the road machine 10 is in the travelling profile of FIG. 2. Once the machine 10 has been set up in its travelling profile, a locking strut 240 is used to connect the adjacent track assemblies as shown in FIG. 2. This is achieved using conventional bolting means to connect the apertured connectors 244 and 250 of the locking strut 240 to the plates 92 utilizing the apertures 252 therein. With the locking struts in position, the machine may be driven along a highway or up a ramp to load on an appropriately sized trailer for transportation.

The discussion up to this point in the disclosure has described in detail the construction features of the frame assembly 12, the leg assemblies 14, the track assemblies 16 and a number of features supportive of those assemblies. While the machine 10 is steerable using the apparatus and procedures outlined above, in practice, most applications will require precision steering. This achieved in the present invention by the use of the cable assemblies 260 as shown in FIG. 15, which is a semi-detailed isometric view of the road machine 10. For the purposes of detailing disclosure herein of the cable assemblies 260, it will be sufficient to say that a cable assembly 260 is provided for the leg assemblies 14 and track assemblies 16 that are connected to the forward end 18 of the frame assembly 12, and a cable assembly 260 is also provided for the leg assemblies 14 and the track assemblies 16 that are connected to the rear end 20 of frame assembly 12. It will be sufficient for the purpose of this disclosure to confine the discussion to one such cable assembly 260, and accordingly this discussion will be confined to the cable assembly 260 located at the forward end 18.

The purpose of the cable assembly 260 is to provide a mechanical feedback loop from the track assembly 16 on one side of front end 18 of the frame assembly 12 to the track assembly 16 on the other side of front end 18. The object of this is to make the track assembly 16 on one side a forward guide track assembly, and to make the corresponding track assembly 16 on the other side a forward follower track assembly which is directed by the cable assembly 260 linkage therebetween. While the detailed discussion herein will be limited to the front end 18 of road machine 10, it will be understood that the same arrangement is followed for the rear end 20, and there is correspondingly a rear guide track assembly 16 and a rear follower track assembly 16 in the same manner as for the front end 18. Following this plan of steering, it will be apparent that the guide track assemblies 16 for the same side of the road machine 10 generally pass in tandem fashion; that is, the forward guide track assembly 16 and the rear guide track assembly 16 for the road machine 10 are located on the same side of the machine. It follows then that the forward follower track assembly 16 and the rear follower track assembly 16 will also be in tandem arrangement on the other side of the machine.

Figure 16:
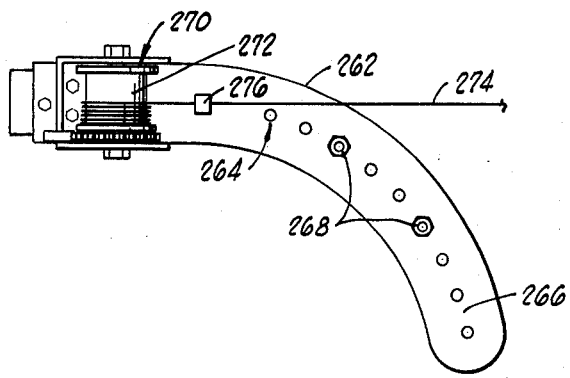
FIG. 16 shows a cable assembly bracket and winch mechanism.

In FIG. 16 is shown a curved bracket 262 having a plurality of apertures aligned along a curve 266. The bracket 262 is bolted to the plate 92 by the bolts 268 to appropriately located apertures in plate 92 such that the curve 266 is equidistantly placed from the vertical cylinder mechanism 76. Attached to the bracket 262 is a winch mechanism 270 which is of conventional design and need not be described in more detail. Connected to the drum 272 of winch mechanism 270 is one end of a cable 274 which passes through a fixed guide 276 affixed to the bracket 262. The purpose of providing a plurality of apertures 264 along the curve 266 is to provide an adjustment for the bracket 262 according to the angle of the track assembly 16 to its respective leg assembly 14; that is, when the machine 10 is set up in its paving profile, the leg assemblies 14 may extend from the respective pivots 15 located at the corners of the machine 10 at variable setting angles as discussed above. Therefore, the disposition of the track assembly 16 will vary relative to the respective leg assemblies 14 to which they are attached. The selection of the appropriate apertures 264 for use to attach the bracket 262 to the plate 92 will depend upon this relative angular disposition, and will permit aligning the guide 276 near the center of the vertical cylinder mechanism 76.

Figure 17:
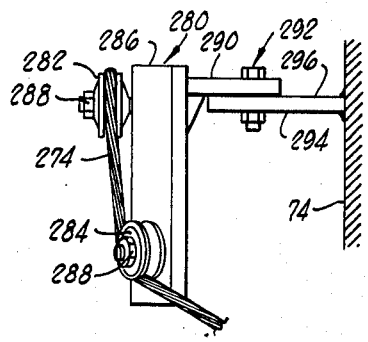
FIG. 17 is a view of the cable assembly double pulley mechanism.
Figure 17A:
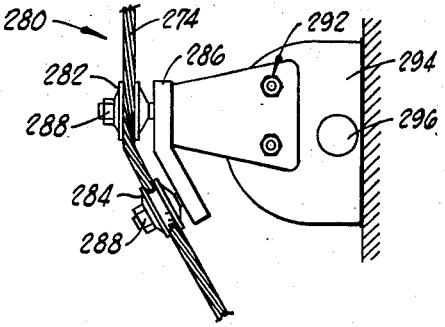
FIG. 17a is a plan view of the same mechanism.

The cable 274, commencing at drum 272, passes over a double pulley mechanism 280 shown in FIG. 17. The double pulley mechanism 280 comprises pulley 282 and pulley 284 rotatingly connected to plate 286 by bolts 288. The plate 286 has a bending configuration so as to expose the pulleys 282 and 284 in relative angular dispositions as shown in FIG. 17a which is a plan view of pulley mechanism 280. The plate 286 is welded to a braced plate 290 having apertures through which bolts 292 attach the pulley mechanism 280 to an apertured lug 294 attached to the leg member 74 of leg assembly 14b in FIG. 15.

Figure 18:
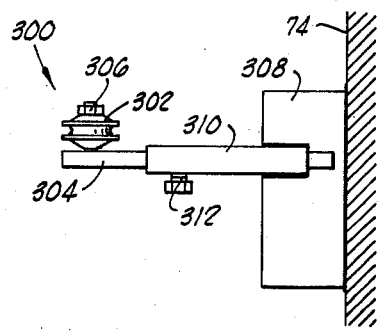
FIG. 18 shows the double pulley mechanism used in the cable assembly in the present invention.

The cable 274, having passed from the drum 272 on bracket 262 over the pulleys 282 and 284, next passes over a spacer pulley mechanism 300 as shown in FIG. 18. The pulley mechanism 300 comprises a pulley 302 connected to a rod member 304 by a bolt 306 passing axially through the pulley 302 and engaging a threaded aperture disposed in the rod member 304. Weldingly attached to the leg 74 of leg assembly 14b in FIG. 15 is an angle iron support plate 308 to which is weldingly connected a tubular holder 310 which is threadingly apertured to receive a bolt 312. The tubular holder 310 is dimensioned to slidingly receive rod member 304 in clearing relationship to the leg 74 as shown in FIG. 18. The pulley mechanism 300 permits lateral adjustment so as to dispose the pulley 302 away from the leg 74 as required when the leg 74 is angularly disposed relative to the frame assembly 12 of road machine 10.

Figure 19:
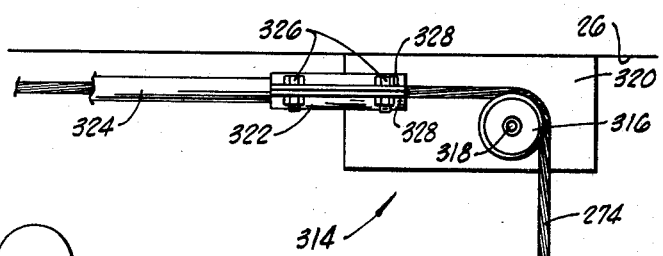
FIG. 19 shows the corner pulley mechanism used in the cable assembly.

The cable 274 next passes over a corner pulley mechanism 314 as shown in the plan view of FIG. 19. The corner pulley mechanism 314 comprises a pulley 316 which is bolted by axial bolt 318 to a support plate 320 welded to and projecting from tubular member 26 located at the forward end 18 of frame assembly 12. Disposed at one end of plate 320 is conduit guide 322 which holds one end of a conduit 324 disposed parallel to tubular member 26. The conduit guide 322 is a conventional split pipe type of conduit holder that is flexible to receive the end of conduit 324; by tightening bolts 326 passing through the mating flanges 328, the conduit quide tightly grips the conduit 324 which serves to shield the cable 274 passing therethrough.

Figure 20:
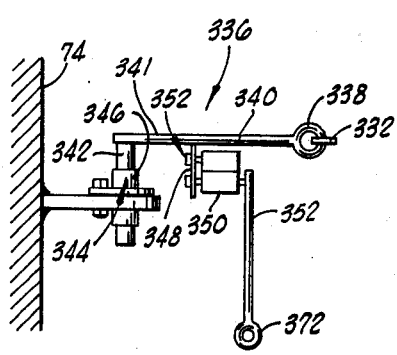
FIG. 20 shows the valve assembly which is part of the steering cable assembly.

Cable 274 continues through the conduit 324 to the other end of the tubular member 26 as shown in FIG. 15, and then it passes over a corner pulley mechanism 330 which is similar in design to the corner pulley mechanism 314 and therefore need not be described for clarity of disclosure. The cable continues from corner pulley mechanism 330 to where it passes over another pulley mechanism 300 that is connected to leg member 74 of leg assembly 14a in FIG. 15. The cable terminates at a hook 332 that is connected to the valve assembly 336 shown in FIGS. 15 and 20. The cable hook 332 detachably connects to an integrally formed loop 338 formed at one end of a swing arm 340. The swing arm 340 has disposed at its other end a pivot bar 342 which is matingly received for pivotation in an adapter plate 344 having a tubular member 346 normal to and passing therethrough. The adapter plate 344 is bolted to a lug 294 of the same design as previously described in FIG. 17 and which is welded to the leg member 74 of leg assembly 14a in FIG. 15. The tubular member 346 is clearingly received by the aperture 296 in the lug 294 and is bolted thereto by the use of appropriately placed apertures and bolts 292. The tubular member 346 is dimensioned to receive the pivot bar 342 for pivotation of the swing arm 340 relative to the leg 74 of leg assembly 14a. Connected to the underside of the swing arm 340 is support plate 348 to which is connected four-way valve 350 having selector arm 352. Valve 350 is bolted to the plate 348 by bolts 352 passing through apertures therein and threadingly engaging threaded apertures in the body of valve 350. The swing arm 340 has an aperture 341 passing therethrough and which is disposed at a point removed from the pivot bar 342, and to which is hooked a spring member 354 as shown in FIG. 15. The other end of the spring 354 is connected by bolting means to the vertical cylinder mechanism 76 in a convenient fashion.

Figure 21:
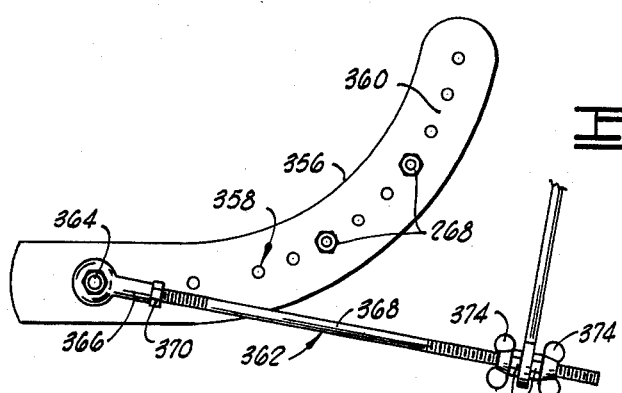
FIG. 21 is a view of the connector rod assembly which is part of the steering cable assembly.

Bolted to the plate 92 of track assembly 16a as shown in FIG. 15 is a bracket 356, the details of which are shown in FIG. 21. The bracket 356 is similar in design to the bracket 262 of FIG. 16, and has a row of apertures 358 like the apertures 264 of bracket 262, except that the apertures 358 lie along a curve 360 that is reverse pitched to the curve 266 of the bracket 262, for the purpose of positioning the apertures 358 equi-distantly from the vertical cylinder mechanism 76 of track assembly 16a as shown in FIG. 15. The bracket 356 is bolted to appropriately disposed apertures in plate 92 by bolts 268 in the same manner and for the same purpose as the bracket 262. Pivotally connected to the bracket 356 at one end thereof is connector rod 362 by bolt 364 passing through loop end portion 366. Loop end portion 366 has a threaded aperture in its end to receive a threaded end of rod 368 and a lock nut 370 threadingly engages this end of rod 368 so as to tighten and secure the rod 368 to the loop end portion 366. The other end of rod 368 is also threaded and passes through the integrally formed loop 372 at the swing end of selector 352 of the four-way valve 350. Finger nuts 374 and a pair of lock nuts 376 cooperate to adjustably connect and determine the positioning of selector arm 352 at its attachment point to the connector rod 362.

The above description of the cable assembly 260 which is disposed at the forward end 18 of the road machine 10 has described the cable 274 connected to the track assembly 16b at the winch mechanism 270, passing over a series of pulleys, and to terminating at hook 332 which is connected to a biased valve assembly 336. The operation of the cable assembly 260, which forms part of the steering mechanism for the road building machine 10 is as follows. Referring to FIG. 15, once the road machine is set up in a desired profile for paving, having its leg assemblies 14a and 14b established relative to the frame assembly 12, and having the track assemblies 16a and 16b in a parallel travelling configuration, the cable 274 is adjusted via the winch mechanism 270 to a length that cooperates with the spring 354 to place the selector arm 352 of the four-way valve 350 in a neutral or null position. The operation of this valve will be discussed more clearly below. The connector rod 362 is then attached to the selector arm 352 and to the bracket 356 so as to maintain the null position established for the selector arm 352. In the null position of the four-way valve 350, the track assembly 16a is not affected by the four-way valve 350 and will travel along a straight path. In practice, the machine is set up so that the tracks 16b and 16a are parallel, and it has been found that this is preferably done by accurately measuring the distance between the track assembly 16a and 16b at several points to establish parallel relationship.

In operation of road machine 10, track assembly 16b is caused to move along a determined route and serves as the guide track assembly 16b. If the track assembly 16b is caused to turn in either direction relative to the leg assembly 14b, the cable 274 is pulled or released by its attachment to the bracket 262 connected to plate 92. The movement of the cable 272 in either direction causes the swing arm 340, to which it is attached, to either be pulled by the pulling of cable 274 or to be pulled in the other direction by the spring 354 upon slack in the cable 274. However, the positioning of the selector arm 352 is fixed at the loop 372 by its connection to the rod mechanism 362 which is in turn attached to the bracket 356 connected to plate 92 of track assembly 16a. Therefore, the movement of the swing arm 340 in either direction causes the pivoting of selector arm 352 relative to the four-way valve 350. The effect of this is to change the selector arm 352 from a neutral or null position and the result of this will now be discussed.

The hydraulic systems of the road machine 10 are conventional in design and will not be discussed in detail for purposes of this disclosure. It is sufficient to state that the track assemblies, driven by hydraulic motors as above stated, are steered by the hydraulic rams 120 that are positioned in attached relationship to the torque arms 142 so as to pivot the vertical members 88 held in pivotal relationship by the vertical cylinder mechanism 76. As above discussed, the track assemblies 16b and 16b' are caused to propel the machine while in tandem arrangement, as are the track assemblies 16a and 16a', these designations referring to FIG. 15. The present invention contemplates the provision of conventional valve means whereby a machine operator positioned at the control panel 380 will be enabled to control the extension and contraction of the hydraulic rams 120 for individual manipulation of the track assemblies 16 to steer the road machine 10. It is also contemplated that it will be desirable to steer the road machine along a roadbed or the like by taking steering instructions from an external source, the steering of the present invention is taught by others, an example of which is the patent issued to Curlett and Gurries, U.S. Pat. No. 3,249,026, which teaches the means for guiding a machine in reference to a stringline. Therefore, by guiding the track assemblies 16b and 16b' by the use of valving means as taught in the Curlett patent, these track assemblies are caused to steer along the determined stringline. With this in mind, the four-way hydraulic valve 350 is appropriately connected to the hydraulic ram 120 that is connected to the leg assembly 14a and the track assembly 16a as shown in FIG. 15. During the set up of the road machine 10, the fixed end of the hydraulic ram 120 that is cleviced to the traveller 112, as shown in FIG. 6, is positioned relative to the screw rod 104 by turning the bolt head 108 such that the travel of the extendable rod 156 has approximately the same amount of extension as retraction within the hydraulic ram 120. For example, a hydraulic ram having a ten inch extension of its extendable rod would be positioned so that the extendable rod would have approximately five inch of extension when the track assembly 16a is established parallel to the track assembly 16b. In this position, as it was above stated, the hydraulic valve 350 is positioned by the set up of the cable assembly 260 to be in a null or a neutral position whereupon the hydraulic ram 120 to which it is connected maintains its extendable rod 156 extended approximately five inches. Once this position of the hydraulic ram 120 is established for track assembly 16a, the traveller 112 is secured by tightening the bolts 132 to tighten the shoes 126 against the traveller 114 and the housing 110. Thus when the hydraulic ram 120 is established in this position in order to steer the track assembly 16a, the extendable rod 156 will have approximately five inches of travel in either direction relative to hydraulic ram 120.

With the above explanation of the steering of the track assembly 16a and 16b, it will be understood that a similar explanation could be given for the steering of the track assemblies 16a' and 16b'. In summary, it will be understood following the above explanation that by the provision of convention hydraulic circuitry the cable assemblies 260, the valve assemblies 336 and external means for reference steering such as taught in the Curlett patent, the machine 10 of the present invention is steered over a roadbed in a manner to lay a precision roadbed.

THE WORKING IMPLEMENTS

The discussion in the present disclosure up to this point has described in detail the road machine 10 as it comprises a frame assembly 12, leg assemblies 14, track assemblies 16 and the steering assemblies 260. This discussion will now turn to the working implements which the road machine 10 further comprises and which are supported by the frame assembly for work upon the road surface over which the machine travels. FIG. 22 is a semi-diagrammatical view of a cross section taken normal to the frame assembly to show the working implements. These implements will be described in detail according to a classification assignment by the function of the particular implements. Following that, a discussion of the curb forming apparatus will be given, and is reserved for the purpose that clarity will ensue from a prior discussion of the working implements. However, in order to describe the connecting feature of the working implements to the frame assembly 12, it will be necessary to next describe in detail the subframe assembly 400, the outline of which is shown in the diagrammatic view of FIG. 22, and detailed in FIG. 23.

SUBFRAME ASSEMBLY

Figure 23:
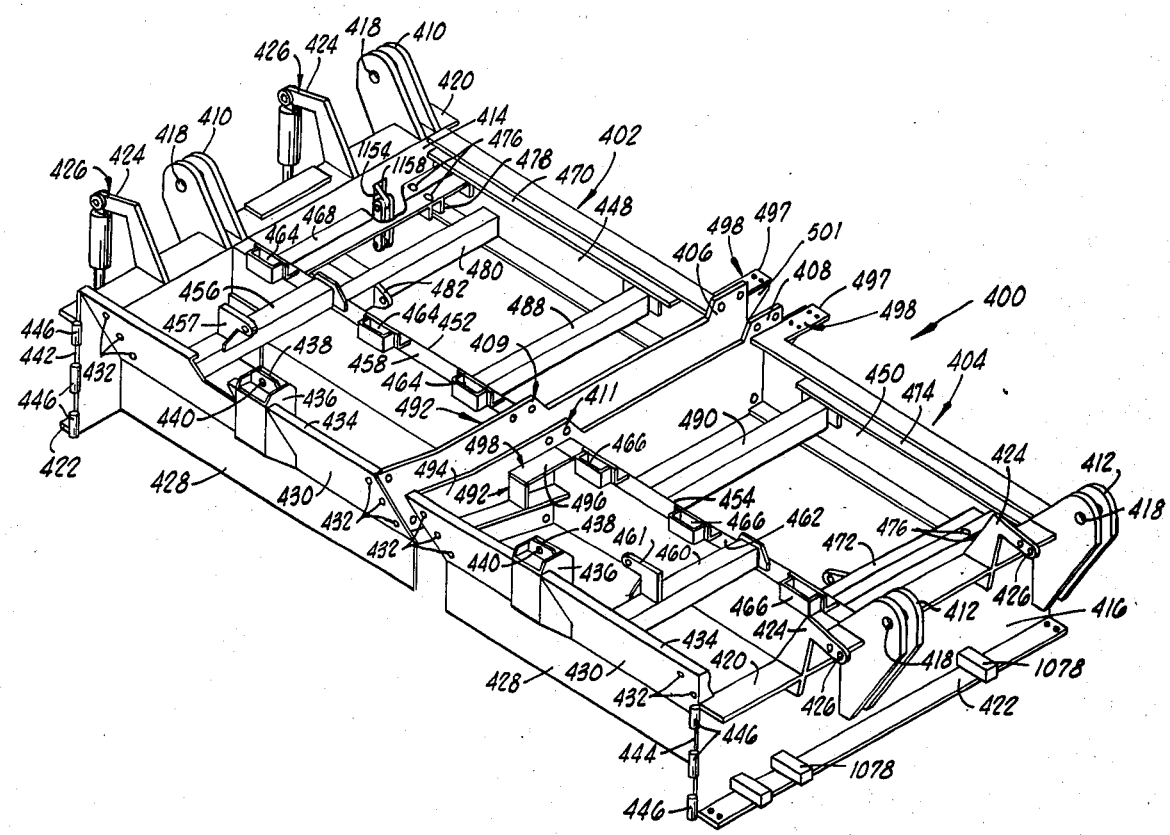
FIG. 23 is an isometric view of the subframe assembly carried by the road building machine of the present invention.

Referring to FIG. 23, the subframe assembly 400 comprises first section 402 and a second section 404 which are shown in side by side relationship as the two sections are hung under the frame assembly 12 of the road machine 10. FIG. 23 is shown in isometric view in order to relate the various components of the subframe assembly 400 more visually. The first section 402 has an end wall 406 which matches in outline the end wall 408 of the second section 404. Each of the end walls 406 and 408 has a number of apertures such as at 409 and 411 that matingly align so that bolting means may be utilized to unify the structure; that is, bolting means is used to secure the end walls 406 and 408 together to form a unified structure, the subframe assembly 400. As will become clear below, the present invention contemplates that the working implements to be described below, as well as the subframe assembly 400, are designed to be expandable from a minimum width to a maximum expanded width. For example, the subframe assembly 400 as shown in FIG. 23 is divided into the two main sections, 402 and 404. It is contemplated that extension attachments will be provided having a profile corresponding to the profile of the end walls 406, 408 and which have end walls that have apertures therethrough that matingly align with the several apertures contained in end walls 406 and 408. When such an extension is disposed between the first section 402 and the second section 404 of the subframe assembly 400, the result is that the total length of the subframe assembly 400 is increased to span a greater lateral distance across the roadbed over which the road machine 10 is travelling while in its paving profile as depicted in FIG. 3. By providing several such extension attachments in variable lengths, the subframe assembly 400 can be made to be extended to a variety of lengths, whereupon the road machine 10 can be made to carry variable length working implements for the laying down of wide paving strips. It will not be necessary for the disclosure herein to detail the extension attachments since the details of disclosure would be redundantly repeating the detailed discussion of the operation of the subframe assembly 400 which follows, thereby making the disclosure herein burdensome without in turn leading to any further clarity of disclosure.

To continue discussing the structure of the subframe assembly 400, FIG. 23 shows that each of the sections 402 and 404 have connectors 410 and 412 extending from the outer end walls 414 and 416 respectively. Each connector 410, 412 comprises a pair of parallel, spaced apart plates welded to the outer end walls 414, 416, and each pair of parallel plates has axially aligned apertures 418 therethrough in the manner shown in FIG. 23. The end wall 414 has an extending rib 420 extending along the top edge and a rib 422 extending along the lower edge to provide additional strength. A portion of the connectors 410 connect to the rib 420 as shown. Going to the outer end wall 416, it can be seen that this wall is ribbed in the same manner as is the wall 414, with the rib 420 running along the top edge of outer end wall 416 and the rib 422 extending along the bottom edge of outer end wall 416. The connectors 412 are weldingly connected to the rib 420 as well as to the end wall 416.

A pair of hydraulic ram hangers 424 are disposed to extend from the outer end walls 414 and 416, the hangers 424 interrupting the ribs 420 as shown. Hangers 424 are welded to the ribs 420 and to the walls 414 and 416 respectively. As shown in FIG. 3, the hangers 424 are generally L-shaped, having a pair of apertures 426 at the external end of each of the connectors.

The first section 402 and the second section 404 of the subframe assembly 400 each has a forward wall 428 which has an angled portion 430 extending upward and toward the forward end 18 of the frame assembly 12. Located near the linear ends of the wall portion 430 are a number of in-line, spaced apart apertures 432. Along the top edge 434 of the wall portion 430 and at approximately the mid point thereof, there is located a vertical box-like support structure 436 which interrupts and is welded to the wall 430. A cross hanger 438 is disposed at the top of the box support structure 436 and an aperture 440 passes therethrough.

In each of the sections 402 and 404 the forward walls 428 are recessed from the leading edges 442 and 444 of the outer end walls 414 and 416 respectively, and the upper portioned wall 430 of each of the sections extends angularly upward and projects above the respective end walls 414 and 416. Located along this leading edge 442 are several spaced apart tubular joints 446 that are hollowed to receive a holding pin to be described later.

The rectangular structure of section 402 is completed by the back wall 448, and the rear section 404 is back wall 450. The section 402 has a laterally disposed mid wall 452 and the section 404 has a laterally disposed mid wall 454. Support tube 456 is welded to the front wall 428, of section 402 and is welded to the top 458 of mid wall 452. Tubular support 460 is welded to the front wall 428 of section 404 and is welded to the top edge 462 of mid wall 454. Bolted to the top edge 458 of mid wall 452 are three spaced apart loop guides 464. In like manner, three loop guides 466 are bolted in spaced apart relationship to the top edge 462 of mid wall 454.

In section 402, support bar 468 is bolted to the top edge 458 of mid wall 452 and extends to and is bolted to an angle iron member 470 extending along and welded to the back wall 448. In like manner, in section 404, support bar 472 is bolted to the top edge 462 of mid wall 454 and extends to and is bolted to an angle iron member 474 that extends along and is welded to back wall 450. The support bars 468, 472 have a pair of laterally in-line apertures 476 located directly over a pair of laterally extending spacer plates 478 disposed on the underside of the support bars. The section 402 has a tubular support member 480 extending from mid wall 452 to the lower edge of back wall 448, the tubular member having an apertured lug 482 extending therefrom. In like manner, but not shown in FIG. 23, the section 404 has a tubular support member 484 extending from mid wall 454 to the lower edge of back wall 450, the tubular support having an apertured lug 486. Section 402 has a tubular support 488 bolted to the top edge 458 of mid wall 452 and extends to and is bolted to angle iron member 470. Also, section 404 has a tubular member 490 bolted to the top edge 462 of mid wall 454 extending to and bolted to the angle iron member 474.

Extending from and projecting upward from tubular support 456 is an L-shaped apertured hanger 457. In like manner, extending from the tubular support 460 is an apertured L-shaped hanger 461.

Shown in FIG. 23 in section 404 is a support structure 492 welded to the inside edge 494 of the end wall 408, the support structure having a platform 496 welded to the mid wall 454, the platform having spaced apart apertures 498 therein. A similar support structure 492 having a platform 496 with apertures 498 is disposed along the inner edge 499 of end wall 406.

Additional platforms 497, also having spaced apart apertures 498, are found butt-welded to back walls 448 and 450 as shown in FIG. 23, and are further supported by the support webs 501 disposed beneath and attached to the back walls.

Figures 24, 26, 27:
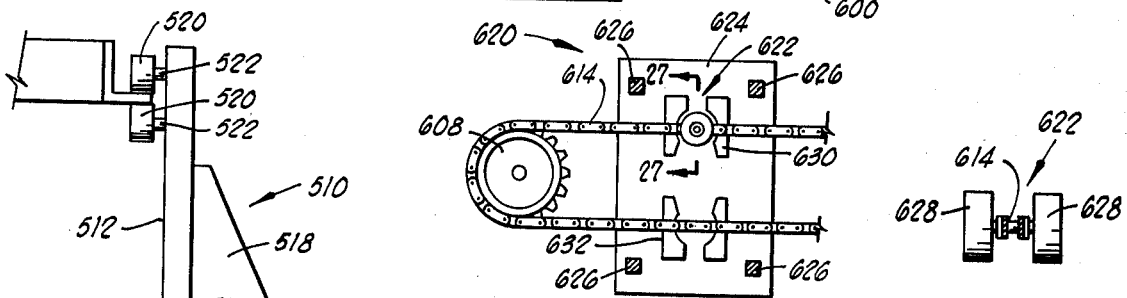
FIG. 24 is a view of one of the supporting devices for the subframe assembly of FIG. 23.
FIG. 26 is a view of the scuttle mechanism which is part of the paddle assembly.
FIG. 27 is a sectional view taken at 27—27 in FIG. 26.

The subframe assembly 400 is sized so as to be disposed under the frame assembly 412 and is connected thereto in the following manner. Side member 42 has a pair of spaced apart, apertured lugs 500 extending therefrom and which align with the connectors 410 of the first section 402. The apertures 418 and the connectors 410 align with the apertures of the lugs 500 and are connected therewith by appropriate retained bolting means. In the same fashion, there are a pair of lugs 502 extending from the side member 44 that boltingly connect with the connectors 412 via the apertures 418 therethrough. When the side members 42 and 44 are disposed adjacent to the center frame section 25 of frame assembly 12, the end walls 406 and 408 are adjacent to each other and are bolted together by appropriate bolting means utilizing the aligned apertures 409 and 411 located respectively in the walls 406 and 408. Additional supporting devices 510 as shown in FIG. 24 are bolted to the platforms 496, 497 of the sections 402 and 404 of the subframe assembly 400.

The supporting device 510 comprises a vertical plate 512 welded to a support plate 514 which has apertures 516 equal in number and spaced to align with the apertures 498 of the platforms 496 and 497, located as described above in the sections 402 and 404. A support web 518 reinforces the vertical plate 512 as it weldingly joins that plate and the support plate 514. Located near the top edge of the support plate 512 is a pair of rollers 520 axially ajoined to the support plate 512 in horizontal disposition thereto on sturdy axis 522. Extending laterally and welded to the members 36 are a pair of angle iron members 524 and 526 located as indicated in FIG. 22. The support devices 510 two for each of the sections 402 and 404, are bolted by appropriate bolting means to the platforms 496 and 497, and engage the angle iron tracks 524 and 526 as shown therein. The subframe assembly 400 then is supported by the connectors 410 and 412 bolted to the lugs 500 and 502 respectively located under the side members 42 and 44, and by the supporting action of the devices 512 rollingly engaged with the angle iron tracks 524 and 526. It will be understood that when the bolting means connecting the end walls 406 and 408 of the sections 402 and 404 of the subframe assembly 400 are removed, upon extending the side members 42 and 44 in the manner described above by the extension of the rams 54 and 56 respectively, the sections 402 and 404 move laterally with the extending side members. This leaves a gap between the end walls 406 and 408 of the sections 402 and 404, and this gap is filled with an extension attachment, the details of which are not herein included except to state that the extension attachments are shaped in the profile of the first and second sections 402 and 404 of the subframe assembly 400, and are provided with support devices like those attached to those sections. As will be clear from the disclosure herein, it is the intent of the present invention to provide a road machine 10 that is extendable so as to be able to construct varying widths of road surfaces by its working implements that are contained under the frame assembly 12, and which are carried by the subframe assembly 400 and extensions of that subframe assembly.

Description of the Spreader

Connected at the front of the subframe assembly 400 is located the spreader means. The preferred embodiment contemplates the use of a paddle assembly 550 as viewed in FIGS. 1, 22 and 25. In general, the paddle assembly comprises a track frame 552 which itself comprises two sections, 554 and 556 joined at the joint 558 by bolting means to comprise a unitary frame. As in the case for the subframe assembly 400, the joint 558 is provided so that when the sections 554 and 556 are unbolted, the frame track 552 can be lengthened by inserting extension attachments which bolt between the two sections. The frame track 552 comprises a top track 560 and a bottom track 562, each of which is made of a rectangular tubular stock which is oriented to have its profile as depicted in FIG. 22. The end walls of the frame track, 564 and 566, each have a flange portion 568 and 570 extending respectively therefrom. The flange portions 568 and 570 are angled to match the slope of the wall portion 430 of the subframe assembly 400 and each has apertures 572 spaced to align with the apertures 432 on the wall portion 430. The section 554 of the frame track 550 has an inner end support member 574 that abuts with and is bolted to the end support member 576 of section 556. Another flange portion 568 having apertures 572 extends from end support member 574 and another flange portion 570 having apertures 572 therethrough extends from end support member 576. As can be seen in FIG. 23, there are four sets of apertures 432 on the angled wall portions 430, and these align with the apertures 572 on the pair of flange portions 568 and the pair of flange portions 570 of the frame track 552. Bolting means utilizing the aligned apertures 432 and 572 connect the frame track 552 to the forward wall 428 of frame assembly 400 by attachment to the upper portion 430 thereof in the manner shown in FIG. 22. Of course, extension attachments designed to lengthen the frame track 552 by interdisposing extension attachments between the sections 554 and 556 will bolt in the same manner as do the extension attachments interdisposed between the sections 402 and 404 of the subframe assembly 400. In this manner, the upper track 560 and lower track 562 will be continuous for any length of extension of the paddle assembly 550.

Figure 25:
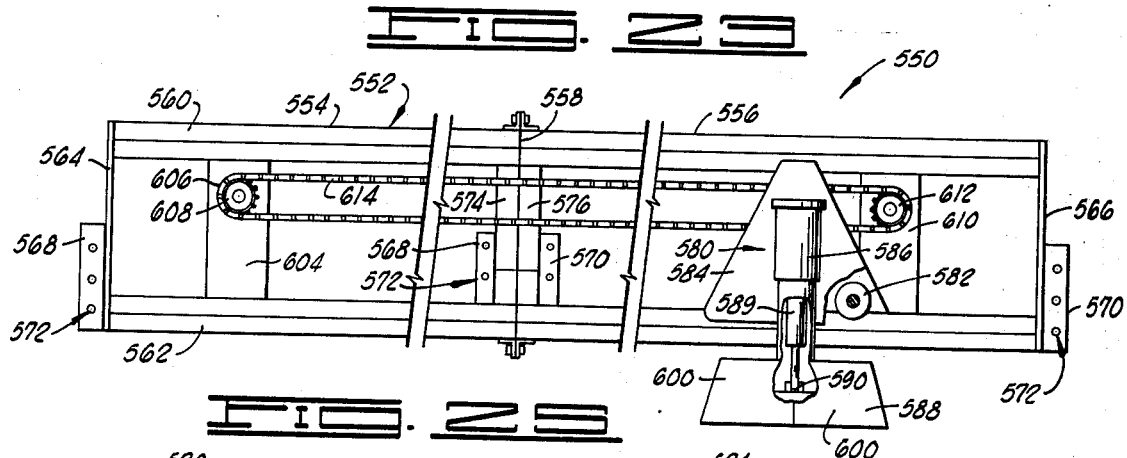
FIG. 25 is a front view of the paddle assembly carried by the road building machine of the present invention.

A traveller 580 is designed with tracking wheels 582 bearingly connected to plate 584, one such wheel 582 exposed by the partial cut-away of the plate 584 in FIG. 25. As can be viewed in FIG. 22, the track wheels 582 are disposed to engage the upper track 560 and the lower track 562 in a manner shown therein. Attached to plate 584 is the box cover 586. A paddle 588 is connected by the way of a hydraulic ram 589 having one end cleviced by bolting means to an aperture lug 590 protruding from the paddle 588 nd the other end connected to hanger rib 592 attached to the inside surfaces of the housing top 594. The lug 590 extends from a plate 596 that has a second housing 598 connected thereto and extending upward so as to surround the lug 590 and extends into the housing 586 in close sliding fit with the walls thereof. In this way, the housing 586 and the housing 598 completely enclose the hydraulic ram 589. Attached to plate 596 and angularly disposed relative thereto are paddle blades 600 that form a V-shaped paddle and are enclosed with a back wall 602.

Referring once more to FIG. 25, located near one end of the section 554 of the paddle assembly 550 is a vertical plate 604 connected to the upper track 560 and the lower track 562. Located at the back of the plate 604 and bolted thereto is a hydraulic motor 606 represented by a dashed circle in FIG. 25. An appropriately sized aperture is disposed in plate 604 and the drive shaft of the hydraulic motor extends therethrough. Attached to the drive shaft is the drive gear 608. Located near the end 566 of section 556 is a vertical plate 610. Bearingly mounted to the plate 610 is the idle gear 612. Drive chain 614 is drivingly engaged with drive gear 608 and is supported by support sprocket 612.

The chain 614 drives the traveller 580 by means of a scuttle mechanism 620 which is depicted in FIG. 26. The scuttle mechanism 620 comprises a cam journal assembly 622 connected to the chain 614. Located back of the plate 584 is plate 624 connected to and spatially positioned therefrom via the posts 626. FIG. 27 is a view taken at 27—27 in FIG. 26 and shows the chain journal assembly comprising a pair of push rollers 628 connected to either side of the chain 614. Attached to and projecting from the plate 624 is an upper pair of jaws 630 and a lower pair of jaws 632. It will be understood that another pair of jaws identical to jaws 630 and jaws 632 extend from the back surface of the plate 584 and are spatially positioned on the other side of the chain 614 from the jaws 630 and 632 attached to the plate 624. The jaws 630 on plate 624 are disposed to engage with one of the push rollers 628 on one side of the chain 614, and the jaws 630 attached to the back side of the plate 584 engage the push roller 628 on the other side of the chain 614. The jaws 632 on the plate 624 cooperate in the same manner with the jaws 632 attached to the back side of the plate 584.

As the chain 614 is driven by the drive gear 608, the chain journal assembly 622 is engaged via push rollers 628 in the mating jaws 630 to push the traveller along the track frame 552. When the traveller 580 reaches the drive gear 608, the gear continues the travel of the chain journal assembly 622 around the drive gear 608, forcing the chain journal assembly 622 to be disengaged with the jaws 630, and while the chain journal assembly 622 is moving about the drive gear 608, the traveller 580 momentarily stops its movement. As the chain journal assembly 622 is brought around to the lower edge of the drive gear 608, the push rollers 628 are engaged by the jaws 632. As the chain 614 continues, the traveller 580 is pushed in the reverse direction, away from drive gear 608. When the traveller 580 reaches support sprocket 612, the chain journal assembly 622, at this point engaging the jaws 632, is released therefrom by its movement about the sprocket 612 and is caused to re-engage the jaws 630. Therefore, by continuous rotation of the chian 614, the traveller 580 is caused to reciprocate on the frame track 552 between the drive gear 608 and the idle gear 612. By the double jaw arrangement of jaws 630 and 632, the chain 614 can be moved in either direction to cause the same result, that of reciprocatingly driving the traveller, and thus the paddle 588, back and forth on the frame track 552.

The hydraulic ram 589 is connected to appropriate valving means, conventional in the art, to extend or contract the hydraulic ram so as to alter the heighth of the paddle 588 above the roadway. In practice, this is done by a manual switch that extends the ram 589 to a determined extension. In order that a machine operator may know that he has extended the ram to a predetermined position, a threaded rod 638 is welded to the top of the housing 598, extends upward through an appropriately placed aperture in the housing top 594 and has a guide nut 639 threadingly engaged therewith. The guide nut 639 is simply placed in a position on the threaded rod 638 so that it comes against the housing top 594 when the paddle 588 has been lowered to its desired height by the manipulation of hydraulic ram 589.

As the traveller 580 reciprocates back and forth, as described above, the hose connections to the hydraulic ram 589 presents the problem of how to provide sufficient length to follow the traveller while preventing entanglement of the hose with the paddle assembly 550. This is conveniently taken care of by providing a pendulum assembly 640 as shown in FIG. 27a. The pendulum assembly 640 comprises an apertured hub 642 having an elongated arm 644 and a counter weight 646. The aperture of the hub 642 fits bearingly over an arbor, not shown, that extends conveniently from the forward edge 18 of frame assembly 12, and the hub is secured to the arbor via bolt means. The hydraulic hoses 648 are shown in FIG. 27 fastened to the arm 644, and extending from the top of the arm to the housing top 594 of the traveller 580. The hoses pass through appropriately sized apertures in the housing top 594 and supply hydraulic fluid to the hydraulic ram 589. As the hoses 648 are pulled by the traveller 580 in its reciprocating travel, the pendulum assembly 640 rotates to give reach to the traveller. When the traveller 580 returns toward the pendulum assembly 640, the counterweight 646 causes the arm 644 to become upright. In this manner, sufficient hose reach and slack is maintained at all times.

Description of the Vibrator Assembly

Connected to the subframe assembly 400 and positioned immediately behind the paddle assembly 550 is the vibrator assembly 650, depicted diagrammaticaly in FIG. 22 and detailed in FIG. 28. A plurality of vibrators 652 are mounted by a curved connector plate 654 to a plurality of bars 656 extending angularly downward from a bar assembly 658. Bar assembly 658 comprises tubular section 660 and 662. One end of the tubular section 660 has a male section 664 which has aperture 668 passing therethrough. Section 660 is matingly received by the female end of the bar section 662, which has an aperture 666 that aligns with the aperture 668. Conventional bolting means connect through the apertures 666 and 668 to secure the bar assembly 658 in unitary configuration. It should be recognized that the bar assembly 658 has been purposefully designed to have a joint near its mid point following the plan of providing extension attachments which can be interdisposed between the bar sections 660 and 662. Since the design of such extension attachments would be along the same detailed construction as for the sections 660 and 662, a detailed discussion of such extension attachments is not required for clarity of this disclosure and is therefore not included.

The vibrators 652 are commercially available electric powered vibrators, each having a cord 670 and an electrical connector 672. Electrical power sockets for the connectors 672 are provided on the forward end 18 of the frame assembly 12 along the leading edge of the tubular member 26. This facilitates the attaching of individual vibrators 652 and the replacement of the same. The type of vibrator is not critical so long it is of good commercial quality and is not affected by immersion in liquid concrete and the like. In order to obtain good distribution of the vibrators, the preferred embodiment has vibrators 652 suspended via curved hangers 654 attached to bars 656 angularly extending from the underside of the bar sections 660, 662 as shown in FIG. 28. In order to provide a good distribution of vibrators, the end vibrator 652a may be oriented normal to the plane of FIG. 28. In that case, the hanger 654 is bolted to a lateral 674 extending from section 662.

At approximately the mid point of the bar sections 660 and 662, an aperture 676 is located for the connection thereto of box structures 678, and FIG. 28 shows a partial cut-away of one of these box structures. Conventional bolting means are utilized to connect the box structure 678 to the aperture 676. The box structure 678 comprises four upward extending walls 680 and a plate 682 laterally disposed and welded at the base of walls 680. Extending from the plate 682 is an apertured connector lug 684. Bolted via clevis mechanisms to each of the connector lugs 684 is a hydraulic ram 686. The rams 686 have apertured connector ends 688 which are joined via bolts to the hangers 438 by way of the apertures 440 therethrough located at the top of the box structure 436 as shown in FIG. 23. In other words, the vibrator assembly 650 is suspended from the subframe assembly 400 by the hydraulic rams 686 that connect to the hangers 438, and are suspended in front of the front walls 428 of the subframe assembly 400, as depicted in FIG. 22. The box structures 678 are dimensioned to be slidingly received in the box structures 436 such that the hydraulic rams 686 are disposed in the resulting housing effected by the inter-fitting box-like structures. Conventional valving means is provided to extend the hydraulic rams 686 and a switch to control the valving means is located on the control console 380 shown in FIG. 1.

As clear from the above discussion on the vibrator assembly 650, the assembly can be established at a determined height by the operator of the machine 10 who controls a switch located on the console 380 that manipulates hydraulic valve means to extend or contract the hydraulic rams 686. In order that the operator will at all times know the relative position of the vibrator assembly 650, a scale mechanism 690 is provided as shown in FIG. 28 and comprises the rod 692 that is connected to the ear tab 694 extending from the top edge of the bar section 660, and extending upward and over the frame assembly 12. A bar 696 is connected in a convenient fashion to the frame 12 and a scale 698 is attached to the bar 696. An apertured rod guide 700 slidingly holds the rod 692 for its vertical movement relative thereto. A press indicator 702 is affixed to the bar 692 and is established relative thereto by finger pressure in order to mark a relative height of the bar 692. As the section 660 is raised or lowered, the rod 692 follows accordingly, the indicator 702 changes position relative to the bar 696 and is viewed against the background of the scale 698.

Description of the Strike-Off Assembly

The strike-off assembly 730 is shown diagrammatically in FIG. 22 and is detailed in FIG. 29; it comprises strike-off members 732 and 734 which are formed of elongated, wide tube-stock, the cross section of which is as depicted in FIG. 22. Connected to the end 736 of the strike-off 732 is an extending plate 738, and extending from the end 740 of the strike-off 734 is plate 742. The plates 738 and 742 are designed to be disposed in parallel and contacting relationship to each other. The plate 742 has an aperture 744 therethrough and the plate 738 has a male connector 746 dimensioned to be received by the aperture 744. Along the top edges of the plates 738 and 742 are mounted apertured connectors 748 and 750 respectively. The strike-offs 732 and 734 are rigidly joined by placing the male connector 746 in the aperture 744 and bolting the extending connectors 748 and 750 together by conventional bolting means.

Extending from approximately the mid points of the strike-off 732 and 734 are the connector lugs 752 which are apertured to be boltingly connected to the clevice end 754 of the hydraulic rams 756. The strike-off assembly 730 is connected to the subframe assembly 400 by the clevice ends 758 of the rams 756, the clevice ends being apertured and boltingly connected by conventional bolting means to the apertures in the L-shaped hangers 457 which extend upward from the tubular supports 456 in the subframe assembly 400 as can be viewed in FIG. 23.

As was the case for the vibrator assembly 650, it is useful in the operation of the strike-off assembly 730 for the operation of the machine 10 to know the height of the strike-offs 732 and 734. To this end, a scale assembly 690a similar to the scale assembly 690 is provided. As the structure and operation of the scale assembly 690a is like that of scale assembly 690, it is sufficient to herein note that the rod 692a is connected to one end of the strike-off 732, and the raising or lowering of the strike-off 732 causes a variable reading to occur on the scale assembly 690a. Conventional valve means is provided to control the extension and contraction of the hydraulic rams 756, and an appropriate switch is provided on the console 380 of the road machine 10 so that an operator can manually adjust the height of the strike-offs 732 and 734. It should be once again noted that the strike-off assembly 730 is constructed so as to be parted as desired near its mid point so that additional strike-off extension attachments can be interdisposed between the strike-offs 732 and 734, the extension attachments being necessary only when the main frame assembly is extended as above described. It should be noted that the strike-offs 732 and 734 are disposed immediately to the rear of the front walls 428 of the subframe assembly 400, as can be viewed in FIG. 22.

Description of the Vibrating Grout Screed

FIG. 30 shows in isometric view one of the pair of tie bar frames 770 that support the vibrating grout screed to be described below. Tie bar frame 770 is comprised of three vertical bars 772 that support the extending, and downward sloping, members 774 that attach to, and support, a laterally extending tow bar 776. Cross bars 778 extend between and connect to the vertical bars 772. The extending members 774 support a row of apertured lug platforms 780, and the tow bar 776 supports a plurality of apertured in line support platforms 782. At the bottom end of each of the vertical bars 772 is a pair of spaced-apart, apertured lugs 784.

The tow bar frame 770 are disposed as shown in FIG. 22 wherein the top ends of the vertical bars 772 are received by the loop guides 464 and 466 that are bolted to the top edge 458 and 462 of the mid walls 452 and 454 respectively in the subframe assembly 400 as depicted in FIG. 23. FIG. 30 shows only one of the tow bar frames 770, and two such frames are normally utilized, with one of the tow bar frames being disposed in the loop guides 464 and the other in the loop guides 466 of the subframe assembly 400. The tow bar frame not shown is of the same design of that detailed in FIG. 30.

FIG. 31 shows a semi-diagrammatical view of the grout screed 790 that is mounted to the tow bar frame 770 of FIG. 30. The grout screed 790 comprises laterally extending member 792, representing the forward edge of the grout screed, and member 794, representing rear edge of the grout screed. Disposed between lateral members 792 and 794, and extending in curvilinear fashion therebetween, are a plurality of spaced apart grout bars 796. Connected to member 792 at spaced apart points thereon are a number of connector plates 798 connected to member 792 by means of a pivoting lug 800. The connector plates 798 have spaced apart apertures 802 that align with the apertures 804 in the support platform 782 of the tie bar frame 770 in FIG. 30. The distance between the connector plates 798 is established to align with the support platforms 782 of the tie bar frame 770. Connected to member 794 is a vibrator platform 806, comprising a pair of spaced apart parallel bars 808 with a cross bar 810 extending normal thereto at the upward end of the bars. Mounted on the cross bar 810 is an aperture plate 812. At the lead edge 814 of each of the vertical bars 808 is located an aperture lug 816.

A pair of the screeds 790 mount to one of the tow bar frames 770, and for purposes of disclosure, it will be sufficient to describe the mounting of one of the grout screeds, as the mounting of the other tow bar frames will be apparent from the following description. In FIG. 32, a mounting plate 820 having appropriately placed apertures is mounted to the tow bar frame 770 on to a pair of the support platforms 780 by means of vibration mounts 822 of conventional design, as shown in FIG. 32. Disposed between the mounts 822 on the mounting plate 820 is a pair of spaced apart apertures through which are passed the all thread bars 824, and secured thereto by means of double locking nuts 826. At the lower end of each of the bars 824 is welded a pair of spaced apart apertured lugs 828.

The grout screed 790 is mounted to the tow bar frame in the following manner. The apertured lugs 828 located on the lower ends of the threaded bars 824 are bolted to the apertured lugs 816 located on the vibrator bars 808 by conventional bolting means, and the connector plates 798 are bolted to the underneath side of the support platform 782 by means of vibration mounts of conventional design. This disposes the grout screed 790 beneath the tow bar frame in the manner depicted in FIG. 22, and the grout screed 790 is insulated from the tow bar frame 770 by the vibration mounts above mentioned. Mounted on the plate 812 by conventional bolting means is a vibrator 830, of conventional structure.

From the above discussion of the vibrating grout screed and the tow bar frames, it is clear that any number of such grout screeds 790 can be mounted in lateral spatial placement on the tow bar frame 770 and like extension attachments that are suspended from the subframe assembly 400. In the paving profile wherein the machine 10 has suspended from the frame assembly 12 the sections 402 and 404 bolted together to form the unitary subframe assembly 400, there will be two of the grout screeds 790 mounted in the above described manner to each of the tow bar frames 770, and two of the tow bar frames 770 mounted to the subframe assembly 400. This then would provide four of the vibrating grout screeds 790 suspended from the subframe assembly 400. Pneumatic vibrators 830 are of conventional design are preferred, and these are provided compressed air from a conventional air compressor unit carried on frame assembly 12. The angle of disposition of the grout bar 796 is adjustable by adjusting the distance of the lugs 828 from the mounting plate 820 by means of positioning the lock nuts 826, and as will be understood, this adjustment determines the penetration of the grout screed unit 790 into the concrete being worked by machine 10.

It will be apparent that the tow bar frames 770 have been described as disposed in the loop guides 464 and 466 mounted on the subframe assembly 400, and it will become clear that the weight of the tow bar frames 770 and the grout screeds 790 are borne by the profile pan assembly as will be described next.

Description of the Profile Pan Assembly

The profile pan assembly 840 is shown in FIG. 33 and comprises a first section 842 and a second section 844. Each of the sections 842 and 844 are box-like structures having ends 846 and 848, respectively, that are bolted together through appropriately placed apertures and conventional bolting means. As for the implements hereinabove described, extension attachments may be interdisposed between the sections 842 and 844, and the design of such extension attachments will not be described in this disclosure as the construction of such attachments will be apparent from the design of the sections 842 and 844 now to be described. Section 842 has a front wall 850, a rear wall 852, and another end wall 854, all of which are welded to the bottom plate 856. In like manner, section 844 has a front wall 860, a rear wall 862, and another end wall 864, all of which are welded to the bottom plate 866. For purposes to be made clear below, the plates 856 and 866 extend outward from the rear walls 852, 862.

Connected to and extending upward from the front wall 850 of section 842 is the shield wall 870, and in like manner the shield wall 872 is attached to and extending upward from the front wall 860 in section 844. Connected to each of the outside ends of the profile pan assembly 840 are the hinge plates 874 and 876 respectively to be connected to the outer ends of sections 842 and 844. The hinge plates 874 and 876 are pinned to the respective sections by the pins 878 that pass through a series of in-line tubular holders in the fashion of a conventional hinge, the tube holders 880 being alternately disposed on the hinge plates and the end walls 854 and 864 of the respective sections 842 and 844 in the manner shown in FIG. 33. The hinge plate 874 is shown removed from the section 842 to show this feature of hinge construction. Interdisposed between the tube holders 880, as shown at the end wall 864 of section 844, is a pair of hinge bolts 882 that are pinned in the hinge joint by the pins 878, and comprise all-thread bolts. It will be understood that a pair of the hinge bolts 882 are also disposed, although not shown, by the pin 872 holding the hinge plate 874 to the end wall 854 in section 842. Each of the sections 842 and 844 have cross brace supports 884 and 886 interconnecting the walls of the sections and attached to the bottom plates 856 and 866. Disposed near each end of the cross brace 886, and extending upward, are the apertured lugs 888 that are connected to the front walls 850, 860 and the rear walls 852. To each of the lugs 888 is bolted a clevice ended all-thread rod 890. The partial cut-away of the shield walls 870 and 872 show the lugs 888 located on the sections 842 and 844, and it will be understood that a bolt 890 is connected to each of the lugs 888 in section 842, although not shown in FIG. 33. The all-thread bolts 892 extend upward and are welded to the bottom plates 856 and 866.

Mounted to the front wall 850 and 860 are the apertured lugs 894. Also, a pair of apertured lugs 896 is attached to and extends upward from the bottom plates 898 of the hinge plates 874 and 876. Boltingly attached to each of the lugs 896 is a clevice all-thread bolt 890, like the ones attached to the lugs 888. It should also be noted that the hinge plate 874 has an integrally formed leading edge 900 and a side edge 902 formed continuously with the bottom plate 898. In like manner, the hinge plate 876 has a forward wall 904 and a side wall 906 formed continuously with the bottom plate 898.

As will be recognized by persons having ordinary skill in the art, the hinge plates 874 and 876 are adjusted to be pivoted on the pins 878 with a slight angularity from the sections 842 and 844 so as to cause an upward slope of concrete material when the road machine 10 is forming a concrete slab, this being as a compensation for the slump of the edges of the concrete road that will occur upon setting. The adjustment of the hinge plates 874 and 876 in this manner is effected by the positioning of the all-thread bolts as below described.

The profile pan assembly 840 as described above and as depicted in FIG. 33, is mounted under the road machine 10 in the following manner. As was described in FIG. 23, the subframe assembly 400 has a pair of support bars 468 and 470 that have appropriately placed apertures 476 to receive the hinge rods 882 and which are retained therein by appropriately sized bolts. In like manner, the bolts 890 are received in appropriately placed apertures that are disposed in the tubular members 488 and 490. FIG. 22 diagrammatically shows the placement of the bolts 890 through the tubular members with appropriate retaining bolts. The purpose for selecting all threaded bolt stock becomes obvious as these determine the adjustment of the distance of the profile pan assembly 840 below the profile pan assembly 840 by adjustably varying the position of the retaining bolt means on the all-threaded bolts 890 and the hinge rods 882. While FIG. 33 shows the bolts 890 and the hinge rods 882 as being in place only on the section 844, this has been so drawn for purposes of simplification of drawing, and it will be understood that the section 842 is equipped in like manner.

In the discussion above for the tow bar frame 770 that is shown in FIG. 30, it was stated that the tow bar frame is slidingly engaged with the subframe assembly 400 with the vertical bar 772 being received by the loops 464 and 466 as diagrammatically shown in FIG. 22. It will now become clear that the weight of the tow bar frames 770 is carried by the leading edge of the profile pan assembly sections 842 and 844 via the lugs 784 on one end of the vertical bars 772 that align with, and are bolted to, the lugs 894 projecting from the front walls 850 and 860 of the profile pan sections 842 and 844. This is shown diagrammatically in FIG. 22. Thus the positioning of the leading edge of the profile pan assembly 840 establishes the position of the tow bar frames 770.

Description of the Float Pan Assembly

The float pan assembly 920 is shown in FIG. 34 and comprises two box-like structures, sections 922 and 924. Section 922 has a back wall 926, a front wall 928, and end walls 930 and 932. These members are welded to a bottom plate 933. In like manner, section 924 has a back wall 934, a front wall 935, and end walls 936 and 938, all of which are welded to bottom plate 939.

The sections 922 and 924 are shown parted in FIG. 34, and it will be understood that the ends 932 and 938 are bolted together through appropriately placed apertures as shown to unify the structure. As is the case for all of the implements carried by the frame assembly 12, and as hereinabove discussed, the float pan assembly 920 is constructed to part near its center so that it may be extended by the interdisposition of extension attachments via bolting means to increase the overall length of the float pan assembly. Such extension attachments are in the contemplation of the invention herein disclosed, and need not be described in detail because the design of such attachments are similar to the structural design of the sections 922 and 924.

Also shown in FIG. 34 are the end attachments 940 and 942, which are bolted to the ends of the sections 922 and 924 respectively. The attachment 940 is shown complete, but the attachment 942 is shown stripped in order to show that attachment's base plate 944 which will now be described. The base plate assembly 944 is a box-like structure having a back wall 946, a front wall 948, end wall 950 and a double partition 952 that is parallel to the end wall 950 and intermediate to the end 954. As shown in FIG. 34, the back wall 946 and the front wall 948 are beam-shaped members for the purpose of adding strength. The base plate 944 has a bottom plate 956 to which the other members of base plate 944 are welded. Located near and attached to the end wall 950 are two pairs of apertured lugs 958 that are also welded to the base plate 956. While this has described the base plate 944 of the end attachment 942, it will be understood that a similar description is applicable to the base plate 945 of the end attachment 940.

Extending from the front walls 928, 934 of the sections 922 and 924 are the attachment plates 960 and 962, respectively. As will be understood, these are welded to the top of the bottom plates 933 and 939, and have apertures 964 appropriately placed and sized so as to be engageable with the all thread bolts 892 that extend from the bottom plates 856 and 866 of the profile pan assembly 840. The bolts 892 are appropriately placed on the sections 842 and 844 so that the attachment plates 860 and 862 will overlap the bottom plates 856 and 866 of the profile pan assembly 840. It has been found desirable in some applications to place a sealer such as neoprene flat stock between the attachment plates 960, 962 and the bottom plates 856 and 866 where these overlap.

Shown in FIG. 35 is the hanger assembly 960 that connects to the back of the float pan assembly 920. The hanger assembly 970 is comprised of the sections 972 and 974 which are I-beam members that are bolted together at 976 to form an elongate structural member. Connected to the outside ends 978 and 980 are the hydraulic rams 982. The hydraulic rams 982 are connected to the sections 972 and 974 by a connector 984 as shown in FIG. 36. The connector 984 is comprised of an L-shaped member 986 that overlaps the upper flange of the section 972, by way of example, in the manner therein shown. A gripping spacer 988 overlaps the other edge of the flange of section 972, and a bolt is passed through appropriately placed apertures and secured by a nut in a manner that tightly grips the upper flange of the section 972. The ram extension 990 of the hydraulic ram 982 is threaded and is caused to be placed through an appropriately placed aperture in the L-shaped member 986 and secured thereto by a double nut arrangement as shown. The upper ends of the hydraulic rams 982 have welded thereto the clevice members 992 for securing via conventional bolting means to the rear end 20 of the frame assembly 12 whereat securing lugs are conveniently placed for this purpose.

As for attachment of the hanger assembly 970 to the float pan assembly 920, apertured plates 1000 are conveniently attached to the end walls 930 and 936. Also, cross braces 1002 are positioned for purposes of strengthening the float pan assembly 920, and additional plates 1000 are welded to the tops of these members. In addition, located along the top of the back walls 926, 934, are several apertured plates 1004 located for the purpose of bolting attachment to the lower flange of the sections 972 and 974 of the hanger assembly 970. These connectors may be seen by reference to FIG. 22.

In operation, the float pan assembly 920 that has been described in detail is pulled behind the profile pan assembly 840, with the entire weight of the float pan assembly being borne upon the surface of the concrete being worked by the road machine 10. The hydraulic rams 982 can be used to apply fluid pressure to the trailing edge of the float pan assembly, or the rams can be quickly disconnected from the sections 972, 974 by the removal of the bolts 987. While the above discussion is complete for the main portions of the float pan assembly 920, discussion of the end attachment assemblies 940 and 942 has been left for discussion under the curb forming means below.

Discussion of the Slipform Means

The slipform means of the present invention comprises several implements that form the restraints against which the concrete edges are formed by way of the implements heretofore discussed and which are carried under the frame assembly 12. The first of these edge restraints are the track shields 1020 shown on the inside surfaces of the track assembly 16 in FIG. 1, and detailed in FIG. 37. The track shields 1020 are comprised of a plate 1022 that is generally shaped to cover the entire inner surface of the track assembly 16 to which it is connected, and has an appropriately sized cut-out 1024 for hydraulic hose access to the track assembly. A shield cover 1026 is bolted to cover the cut-out 1024 such that the hydraulic hoses have access from the top. The cover 1026 is bolted to the plate 1022 by conventional bolts. It will be recognized that the view shown in FIG. 37 is an isometric view of the track assembly side of the shield 1020, and this has been done for the purpose of showing the attachment detail necessary for connecting the track shield 1020 to the track assembly 16. Running along the inner surface 1028 are the angle iron members 1030, 1032 and 1034, which are welded thereto and have a number of stand-off members 1036 projecting therefrom for the purpose of uniformly establishing the distance between the track shield 1020 and the track assembly 16. Affixed to the members 1030 and 1032 and 1034 are the tube members 1038. Projecting from the track assemblies 16 at appropriate locations thereon are mating tube members similar to 1038 and aligning therewith. The pins 1040, one of which is shown in FIG. 37, pass through the paired tube members 1038 and are received in like manner by the tube members on the track assembly 16 for the purpose of pinning the track shield 1020 to the track assembly 16.

The front edge 1042 of the plate 1022 is curved at its lower edge, and a curved plate 1044 is welded normal thereto to provide a sled-like edge for the shield 1020. At the rear edge 1046 of the shield 1020 are welded the tube members 1048. An angle plate 1050, having appropriately spaced tube members 1052, connects via the pin 1054 to the rear edge 1046, and is secured thereto by the passing of the pin 1054 alternately through the tube members 1052 and 1048. Located at the rear edge 1054 of the angle plate 1050 are a number of in line tube members 1056 which are appropriately spaced to align with the tubular joints 446 located on the leading edge 442 of the subframe assembly 400, as shown in FIG. 23. A pin 1058 is provided to connect the angle plate 1050 to the subframe assembly 400 by alternately passing through the tubular joints 446 and the tubular members 1056 when appropriately aligned.

In operation, the pair of track shields 1020 that are provided on the track assembly 16 in the manner shown in FIG. 1 serve to receive bulk concrete that is poured in front of the road building machine 10, such as from dump trucks. The track shields 1020, connected to the subframe assembly 400 as described above, serve to funnel the concrete into the working implements carried beneath the frame assembly 12 as the machine 10 progresses forward thereover. The spreading means, that is the paddle assembly 550, serves to uniformly disperse the concrete in front of the vibrators which immediately thereafter follow.

The next portion of the curb forming means to be described are the side form assemblies which are carried by the subframe assembly 400, one of which is shown in FIG. 38. The side form assembly 1070 comprises a side form member 1072 which is a long, elongate member that is held by a pair of hanger assemblies 1074 that connect to the subframe assembly 400. A side view of a hanger assembly 1074 is shown in FIG. 39.

Each hanger assembly 1074 has a pair of generally L-shaped plates 1076 that pivotally connect to the support lug 1078, which can also be seen on the rib 422 in FIG. 23. As will be understood, apertures are provided in the plates 1076 as well as in the support lugs 1078, and appropriately sized pins pass through the aligned apertures. Conventional keeper means are provided to secure the pins therein.

Also provided in the plates 1076, described in the singular, is an aperture 1080 near the distal end of the plate, and an aperture 1082 intermediate thereto. A rod guide 1084 is provided that has an aperture that aligns with aperture 1080 and is pivotally secured thereat by the pin 1086. The rod guide 1084 also has an aperture passing therethrough and which receives the standoff rod 1088 which is threaded and provided with adjusting nuts 1090. The distal end of the standoff 1088 has an apertured clevice 1092. On the outside of the side form members 1072 is located a pair of connectors 1094 which has apertures 1096 located near its upper and lower ends. The clevice 1092 is pivotally connected to the lower aperture 1096 on the connector 1094 by way of a conventional pin. In the same manner as described for the standoff rod 1088, an upper standoff rod 110 is connected by way of a similar rod guide 1084, pivotally connected at aperture 1082, and connected by way of clevice 1102 pivotally at the upper aperture 1096 by conventional pin means. The threaded standoff rod 110 is also provided with adjusting nuts 1090 in the manner described for standoff 1088.

The resulting connection from the structure described for the pivoting connections of the standoff rods 1088 and 1100 which are pinned between the plates 1076 and the connector 1094 as illustrated in FIG. 39, is a unique connection in that it permits a general up and down movement of the side form member 1072 relative to the plate 1076 while at the same time preventing any lateral movement of the same. The side form member 1072 is biased as will become clear from the following discussion in order that such up and down movement is negotiated against a biasing force. The purpose of such structural design is to permit the side form member 1072 to pass over irregularities in the roadbed over which paving is occurring. By a bias force being applied, the member 1072 is able to relieve itself by passing over a small obstruction, while at the same time, it is restrained laterally.

The side form member 1072 is shown in side view in FIG. 39, and this view reveals the indented shape of the side form member. That is, a longitudinal groove 1110 extends the length of the side form member 1072, and as will be understood to those skilled in road building, this forms a lap joint in the edge of the formed concrete road. If this is not desired, a filler member, not shown, may be inserted in the groove 1110 to fill it.

Extending from the side form member 1072 are the apertured lugs 112 that are pinned to the hanger assembly by way of the clevice 1114 that is welded to the proximal end of the biasing rod 1116, one of which is shown in FIG. 39. Extending from the side of the plate 1076 is an apertured shoulder 1118.

The biasing rod 1116 passes through the aperture in the shoulder 1118 and an adjusting nut 1120 is provided. Also provided is an adjusting nut 1122 and a washer 1124. A spring is disposed between the washer 1124 and the shoulder 1118, as shown in FIG. 39. It will be apparent from the structure as described that the biasing force on the side form member 1072 is provided by the spring 1126, and that the biasing force is adjusted by the placement of the adjusting nuts 1120 and 1122.

The hanger assembly 1074 is pivotal about the support blocks 1078, and the purpose of this design feature is to permit the side form members to be swung up and conveniently stored in an out-of-the-way fashion. Hydraulic rams 1130 are provided to hold the hanger assembly in place during road forming operations. The rams 1030 are pivotally connected to the apertured lugs 1132 that extend from the plates 1076. The other ends of the rams 1130 connect via the clevices 1134 and bolting means to the hangers 424 that project from the outer end wall 416 of the subframe assembly 400. This structure is shown in FIG. 38, and as provided with conventional valving means, it is apparent that the hydraulic rams 1130 operate to place the side form members 1072 in the position therein shown or in a retracted position wherein the side form members 1072 are pivoted upward. Although the description herein has been directed to one of the side form assemblies 1070 of FIG. 39, it will be understood that a similar side form assembly is provided on the other side of the subframe assembly 400.

As illustrated in FIG. 39, the side form member 1072 is held in its working profile in close proximity to the hinge plate 876. In practice, a bridge plate 1140 spans between the hinge plate 876 and the side form member 1072. It has been found necessary to provide a downward force on the hinge plate 876, and this is accomplished in the following manner.

Figures 40, 43:
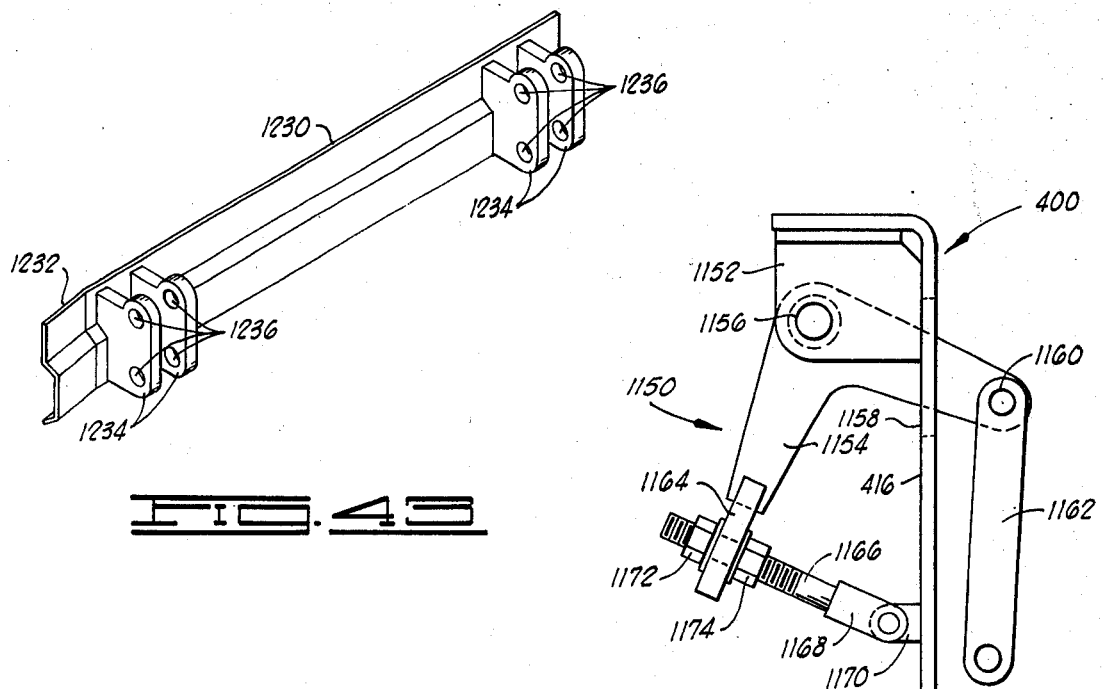
FIG. 40 is a view of the hinge plate setting mechanism of the present invention.
FIG. 43 is an isometric view of the side form carried by the end attachment mechanism shown in FIG. 41.

Shown in FIG. 40 is the side view of the hinge plate setting mechanism 1150 that is connected to the subframe assembly 400 at the end walls 414 and 416. For purposes of disclosure, the hinge plate biasing mechanism 1150 provided for the hinge plate 476 is illustrated in FIG. 40 and will be herein described in detail. It will be understood that a similar hinge plate setting mechanism is provided on the end wall 414 of subframe assembly 400 to set the hinge plate 874. A generally L-shaped hinge bracket 1154 is provided that has an aperture near its bend for pivoting it about a conventional pin that stakes the bracket to the aperture 1156 in the support lug 1152. As may be seen by referring to FIG. 23 temporarily, one end of the bracket 1154 projects through an aperture 1158 provided in the end walls 414 and 416 of the subframe assembly 400. An aperture is provided in the end of the bracket 1154 extending through the aperture 1158, and a pin 1160 is positioned in the aperture in order to connect with a pair of struts 1162 that are apertured at both ends. At one end, the struts 1162 are pivotally connected to the pin 1160, and at the other end, the struts are pinned to the apertured lug 896 that is welded to and extends upward from the hinge plate 876, as shown in FIG. 39. Going to the other end of the bracket 1154, an apertured lug 1164 may be viewed in FIG. 40. A threaded rod 1166 having a clevice end 1168 is pinned thereby to an apertured lug 1170 extending from the end wall 416 of the subframe assembly 400. The threaded end of the rod 1166 passes through the aperture of the lug 1164, and adjusting nuts 1172 and 1174 are provided to secure the position of the lug 1164 on the rod 1166.

In operation, the angle of the hinge plate 876 can be adjusted by changing the position of the bracket 1154 relative to the rod 1166. That is, by moving the adjust nuts 1172 and 1174 along the rod 1166, the angle of bracket 1154 about the pivot 1156 is altered. As was discussed previously, the angle of hinge plate 876 is established as a slump factor for the edge of the concrete being worked by road machine 10. The angle of the hinge plate establishes the angle which the formed concrete has along its top at its edges. As the concrete sets up, its top slumps to form properly shaped edges.

Figures 41, 42:
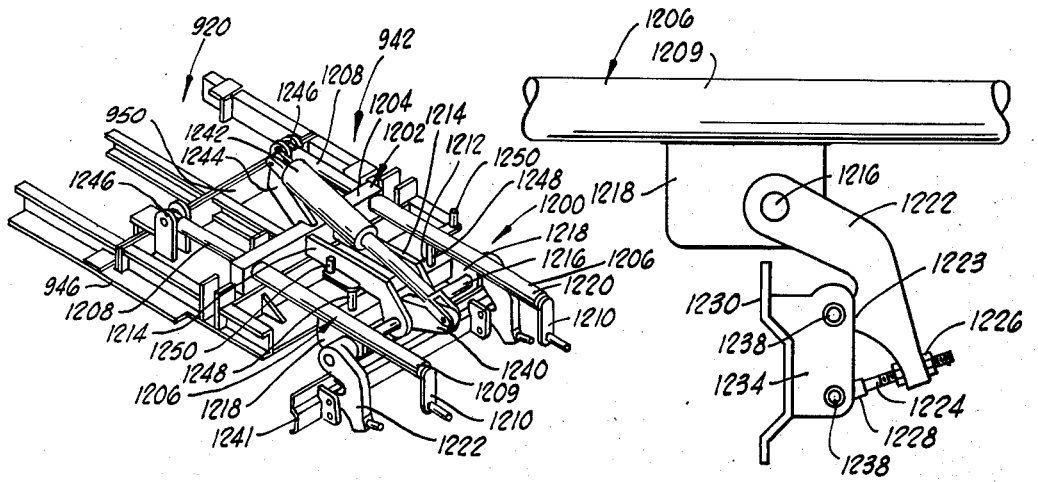
FIG. 41 is an isometric view of the end attachment mechanism that adjustably supports the side form carried beside the float pan assembly.
FIG. 42 is a side view of the connector portion of the end attachment mechanism shown in FIG. 41.

The next portion of the slipform means is found in the end attachments 940 and 942 that are attached to the float pan assembly 920. The base plate 944 was described in detail above, and the remaining portion of the end attachment 942 will now be described. In FIG. 41, the end attachment 942 is shown complete, as was the end attachment 940 in FIG. 34. It will be understood that the description to be given for the end attachment 942 will be applicable to the structure of the end attachment 940, which is attached to the opposite end of the float pan assembly 920.

In addition to the base plate 944, the end attachment 942 is comprised of the hanger assembly 1200 as shown in FIG. 41. This hanger assembly 1200 includes a frame 1202 which has a beam 1204 which runs parallel to the end wall 950 of the base plate 944. At the ends of the beam 1204 and running perpendicular thereto are a pair of adjusting screws 1206 that have extendable rods 1208, housings 1209 and crank handles 1210. The screws 1206 are of conventional design and have internal screw mechanism for the extension of the rods 1208 with the manual turning of the cranks 1210. Connecting the screws 1206 at a point removed from the beam 1204 is the cross brace 1212, a further description of which will be given later. Extending from the beam 1204 and running parallel with the screws 1206, a pair of braces 1214 connect with the cross brace 1212, and overlapping same, these provide guide apertures for the shaft 1216 passing normal thereto and extending through the lugs 1218 that extend downward from the housing 1209 of the screws 1206.

Referring to FIG. 42, one of the lugs 1218 is there shown together with the apertured connector 1222 that is mounted on the shaft 1216 that passes through the lug 1218, the connector 1222 being keyed on the shaft 1216 so as to turn with the rotation of the shaft. Connector 1222 is apertured at its distal end to receive therethrough the threaded rod 1224 together with the bolt means 1226 in the manner shown in FIG. 42. The rod 1224 attaches to an apertured connector 1228.

A side form 1230 is shown in FIG. 43, the purpose of which is similar to the side forms 1072 that are held by the side form assembly 1070 at the sides of the subframe assembly 400. Side form 1230 is also shown in FIG. 41 positioned in place by the hanger assembly 1200. The side form 1230 has the same profile as the side form 1072 as shown in FIG. 42, and has a flaired leading edge 1232. In practice, flaired edge 1232 is positioned in approximate adjacent relationship to the trailing edge of the side form 1072. As was indicated for side form 1072, a filler element may be used with side form 1230 to vary the profile of the side form.

Side form 1230 has paired lugs 1234 extending therefrom, the lugs having aligned apertures 1236, as shown in FIG. 43. Again referring to FIG. 42, the connector 1222 is pivotally connected to a pair of the lugs 1234 by an appropriately sized and staked pin 1238 passing through a pair of the apertures 1236 and an aperture in the finger 1239 which extends from the connector 1222 intermediate to its ends. Also, in like manner a pain 1238 is placed through the other pair of aligned apertures in the lugs 1234 and is caused to pass through the connector 1228. From this arrangement, it is apparent that the relative placement of the side form 1230 to the connector 1222 is adjustable by the placement of the bolt means 1226 on the threads of the rod 1224.

As shown in FIG. 41, also connected to the shaft 1216 is the lever arm 1240. As will be clear from the view therein, the lever arm 1240, which is keyed on the shaft 1216, is provided for the pivoting of the shaft 1216 by the application of a force to the distal end of the lever arm. That is, the shaft 1216 and consequently the connectors 1222 are rotatable by turning the lever arm 1240. This is provided for the purpose of being able to pivot the connectors 1222 and thus the side form 1230 upward and clearingly removed from the edge of the concrete being worked by the road machine 10. The application of turning force to the lever arm 1240 is effected by a hydraulic ram 1242 and conventional valving means thereto. One end of the hydraulic ram 1242 is connected via conventional bolting means to the lever arm 1240, and the other end of the ram is connected to arm 1244 that extends upward from the beam 1204. Thus, by manipulating the valving means to control the extension or contracting of hydraulic ram 1242, lever arm 1240 is caused to pivot the shaft 1216 and consequently raise or lower the side form 1230.

The frame 1202 is connected to the base plate 944 in the following manner. The extension arms 1208 of the screws 1206 have apertured lug ends 1246 that are bolted to the lugs 958 that extend upward from the bottom plate 956. Additionally, standoffs are provided via the threaded rods 1248 that pass through the threaded apertures in the cross brace 1212 of the frame 1202. Cranks 1250 are provided for adjustment purposes, and pressure plates, not shown in the figure, are provided opposite to the crank ends on the rods 1248 as pressure bearing points for the weight of the structure.

In operation, the side form 1230 is positioned for final forming of the edge of the formed concrete by the manipulation of the valving means controlling the hydraulic ram 1242. The angular adjustment of the side form 1230 is adjusted via bolt means 1226 on the threaded rod 1224. The placement of the side form 1230 relative to the side of the profile pan assembly 920, or from the end attachment 942, is effected by the adjustment of the cranks 1210 which position the housings 1209 of the screws 1206 relative to the extending rods 1208. Thus, by turning the cranks 1210 the frame assembly 1202 is adjusted laterally.

Operation of the Road Machine 10 and Its Working Implements

In operation of the road machine 10 with its working implements, it will be understood that the purpose of the machine is to: receive bulk liquid concrete at the front of the machine; spread, vibrate, condition, and shape the concrete; and finally smooth the surface and edges thereof into a determined width and thickness to form a concrete road lane.

In performing its task, the present invention provides a multi-adjustable machine that is capable of being assembled in its working profile or into its travelling profile, and from one to the other, in a minimum of time and expense. In the description given above for the structural details of the road machine 10, comments have been included relative to the operation of the machine for purposes of clarity of understanding of the structure. Generally speaking, many of the comments so given are sufficient to describe many aspects of the operation of road machine 10, and it will not be necessary to elaborate further. The purpose under this section of the disclosure will be to give an overall understanding of the operation of the road machine 10 together with its working implements, and to add to that which has gone before.

As will be understood by persons familiar with the paving industry, slipform pavers are generally controlled automatically as the machine travels along a prepared roadbed surface. Control systems for guiding the machine are known and have been referenced above. It is sufficient to say that road machine 10 herein disclosed has exceptional versatility and control possibilities. The provision of the pivotal track assemblies 16 and the pivotal leg assemblies 14 combine to afford a wide range of widths which can be achieved by the use of the expanding side members 42 and 44 in the manner depicted in FIG. 3. As was discussed in the structural description given above, all of the working implements that are carried under the frame assembly 12 are made in sections that part in their approximate centers. Assuming that the implements hereabove described are appropriately attached and connected under the frame assembly 12, it is only necessary to unbolt the various sections as provided near the centerlines of the assemblies; the machine 10 can then be widened by expanding side members 42 and 44 by extending the hydraulic rams 54 and 56 in cooperation with the manipulation of the track assemblies 16 for the distribution of the weight of the road machine 10 as was discussed above. (In addition, it will be understood that lengthening the chain 614 is another step in the parting of the sections 554 and 556 of the paddle assembly 550.) Understandably then, widening of the frame assembly 12 by extending the side members 42 and 44 provides a gap between sections of each of the working implements connected to the frame assembly. In the manner indicated in the discussion above, extension attachments are then bolted between the parted sections of the implements to fill the gap thus created by the widening thereof. It is in the contemplation of the invention herein that appropriate extension attachments be provided for each of the working implements in ranges of lengths to correspond to increments of probable widths commercially required and achieved by the extension of the side members 42 and 44 of the frame assembly 12. That is, it has been determined that the best practice is to provide several extension attachments for each of the working implements, ranging in lengths from one foot upward so that the extension attachments can be used in combination to provide effectively any length required to fill the gap between implement sections created by the widening of road machine 10. While figures have not been included for such attachments, it will be understood that such extension attachments are provided that have the same characteristics of operation as the basic implement, and which are to be bolted to the sections in the manner above described. In the case of the paddle assembly 550, additional links must be placed in the chain 614 to accommodate the extension of that assembly.

It will be necessary, in widening the frame assembly 12 to the wider widths of its capabilities, to pivot the leg assemblies 14 so that the leg assemblies assume angled positions relative to the cross members 46 and 50. That is, it may be necessary on some occasions to set the leg assemblies 14 at an angle to the cross members 46, 50 while the machine is in its paving profile. This may be necessitated by such considerations as the requirement to clear obstacles or for other reasons associated with the construction requirements. It will be recognized that this is possible with the pivoting design of the connections of the track assemblies 16 and leg assemblies 14 to frame assembly 12.

Steering of the machine 10 during its paving operation is achieved by providing external guide means to one side of the machine as described in the description of FIG. 15 above. It will be recognized that the cable assemblies 260 have been designed so that steering can be achieved by externally directing either side of the machine, while making the other side respond to the guided side. The cable assemblies 260 are easily assembled to make either side of the machine the follower side, as all of the component parts of the cable assemblies may be assembled to either side of the machine. Also, by providing the quickly assembled cable assemblies 260, it will be recognized that once the cable assembly is adjusted for its length by the manipulation of the winch mechanism 270, FIG. 16, the road machine 10 can be quickly returned to a given set-up from the travelling profile to the paving profile. In other words, once the machine 10 is set-up for steering at a particular width and at a particular setting of the cable assemblies 260, the cable assemblies 260 can be quickly and easily disconnected; the road machine 10 can be quickly placed in its travelling profile without disturbing the steering set-up of the cable assemblies 260; the machine can be transported while in its travelling profile; and once the machine has arrived at is next location, it can be reestablished in the same paving profile with the cable assembly 260 reconnected without futher adjustment to the cables.

This is an important feature that the present invention provides: that of being assembled in its paving profile for a particular paving requirement, changed to its travelling profile, and returned to its paving profile in the same set-up without disturbing any of the adjustments necessary for a particular paving width. Not only do the cable assemblies give versatility to the steering means as described, but also all of the working implements may be raised for clearing the ground by the extensions of the track assemblies for quick change of the road machine to its travelling profile, and vice versa. Also, the side forms connected to the side may be readily swung up and out of contact with the paving edges.

In the operation of the road machine 10, exceptional thickness control of the concrete being formed can be effected by control of the extensions of the track assemblies 16. Without discussing further the structure thereof, reference is made once more to FIG. 5 for the purpose of pointing out that hydraulic rams 98 control the height of each corner of the frame assembly 12 by varying the extensions of the respective hydraulic ram. It is in the contemplation of the present invention that this versatility of height control is used for controlling the height of the working implements under the frame assembly 12. That is, by providing external signals to an appropriately designed system for controlling the valving means that extend the hydraulic rams 98, the height of the frame assembly 12 and the working implements above the ground can be controlled. In practice, it is contemplated that a stringline or other external signal be provided in conjunction with sensing and control means to manipulate and control the height of each corner of the leg assembly 12, or for each side of the frame assembly. It should be noted that the height of the leg assembly 14 relative to its respective track assembly 16 can be varied independently to and without interruption of the position of the leg assembly 14 to the frame assembly 12 and to the steering means for guiding the directional path of the track assemblies. This permits the leveling of the frame assembly 12 under varying conditions of roadbed conditions. For example, the track assemblies 16 on one side of the machine 10 can be operated in a ditch (in a lower profile) while the other side is operated along a higher surface. This is an important consideration in those instances where roadbeds are narrow relative to the concrete lane being formed.

Another feature of the present invention in regard to the steering means for the machine 10 is that manual steering of the machine is effected by simply providing conventional means to control the hydraulic rams 120 that pivot the track assemblies 16. Also, manual positioning of the hydraulic rams 98 is contemplated such that the frame assembly 12 can be maintained at an appropriate height and leveled by the manual manipulation of conventional valve means for controlling the extension of the hydraulic rams 98.

The paving operation of the present operation can best be described by reference to FIG. 22, which is a semi-diagrammatical view of the working implements carried by the frame assembly 12. Bulk concrete is delivered and dumped in front of the traversing paddle of the paddle assembly 550 and is contained to the sides by track shields 1020. As the paddle 588 moves from one side of the track 552, to the other, the blades 600 serve to evenly disperse the concrete in front of the vibrator assembly 650.

The vibrators 652 are located in close proximity to the paddle 588 and are placed below the surface of the concrete so that good vibration is achieved in a vibrating zone that includes the spreading area of the paddle. As the machine 10 travels forward, the vibrated concrete, having passed the vibrators, is next contacted by the strike-off assembly 730 which provides a preliminary leveling of the concrete. Immediately following the strikeoff assembly 730, the vibrating grout screed 790 engages the flowing concrete, forcing the large aggregate or grout to be depressed beneath the grout bar 796. Vibration of the grout bars in cooperation with the angle of attack of the bars, determined by the adjustment of the hanging rods 824, prepare the concrete for the profile pan assembly 840 that immediatley follows. An important benefit derived from the design of the grout screed assembly 790 is that the assembly is self cleaning, in that it passes through the concrete without accumulating material thereon.

The vibrator assembly 650 and the strike-off assembly 730 both have adjustable heights that the operator of the machine can set by manipulating conventional valving means to the hydraulic rams 686 and 756. These two implements cooperate in a very important manner to control and confine the pumping up of concrete to the space immediately in front of the profile pan assembly 840. Persons skilled in the art of slipform paving machines will recognize that one of the problems encountered with slipform paving machines is the pumping up of concrete, a phenomenon that occurs immediately following the last working implement on the paver. That is, the concrete which has been formed by the slipform paver has a tendency to swell or to increase in thickness once the machine has passed over it. In the operation of the present invention, it has been found that this effect is practically negligible, be problem being effectively corrected by the adjustments of the vibrator assembly 650, the strike-off assembly 730 and the vibrating grout screed 790. By locating the vibrating assembly 650, the strike-off assembly 730 and the vibrating grout screed 790 in sequence immediately in front of the profile pan assembly 840, the space in front of the profile pan serves as a surge reservoir in which the pumping-up can occur. Furthermore, the concrete is conditioned so that the profile pan more easily forms the concrete. In practice, it has been found that the hydraulic pressures required to drive machine 10 over and through concrete is far less than that experienced in prior art paving machines. One reason for this is the conditioning of the concrete by the combination and location of the vibrator assembly 650, strike-off assembly 730 and grout screed 790 relative to the profile pan assembly 840.

While it is conventional for other slipform paving machines to rely upon the angle of attack of the profile pan in cooperation with machine weight to form the concrete, the present invention conditions the concrete such that the profile pan is essentially passing over the liquid portion of the concrete mix, the aggregate having been depressed to a controlled depth by the grout screed. As an example of this, it is typical to have a two to three foot wave of concrete in front of the profile pan on prior art machines, while in the present invention, it has been found that the profile pan will have a few inches at best in front of it and this will be primarily liquid. In effect, the action of the present invention can be stated as that of imparting vibrating energy in combination with the spreading, leveling and aggregate working of the concrete in such a manner that the mass of concrete is a dynamically treated mass prepared and pre-shaped prior to passing under the profile pan.

Not only does the above described action of the present invention provide better operation of the paver, it also gives a better concrete surface. First, this is the result of the better control of the pumping up, as stated. Another reason is that the aggregate conditioning of the concrete in combination with the other implements prevents aggregate emersion, a phenomenon known as popping-up.

Another benefit of locating the vibrators in close proximity to the spreader assembly is that the imparted energy aids in the spreading of the concrete by the traversing paddle 588. The result is that the forward track pressure of machine 10 is lessened, the proof of which being in the reduction of hydraulic pressure required to drive machine 10 than prior art machines, described above as contributed also to the combined effect of the implements. All of the vibration is effectively directed to the concrete by the location of the vibrator mounts, and this energy reaches forward of the vibrators to assist the spreading function of the paddle assembly 550.

Returning to the operation of the profile pan assembly 840, this assembly serves to squeeze the concrete downward and against the side forms 1072 carried at each side of the profile pan assembly by the side form assemblies 1070. The angle of attack of the profile pan assembly 840 is adjustable by the hinge rods 882 by which the profile pan assembly attaches to the subframe assembly 400.

Immediately following the extrusion of the concrete by the profile pan assembly 840, the concrete mix is given a final surface smoothing by the floating action of the float pan assembly 920 that immediately trails, and is pulled by, the profile pan assembly. In practice, it has been found that good results are obtained by releasing the back end of the float pan assembly 920 altogether by disengaging the hydraulic rams 982 from the carrier 970 that attaches to the rear end of the float pan assembly. The rams 982 serve to elevate the back end of the float pan assembly as required for transporting.

While the above discussion has been determined to provide a total disclosure of the present invention, numerous details of the structure of the road forming machine 10 as well as many details of operation of the same have been omitted from the discussion herein for the reason that such details are unnecessary for the purpose of the disclosure herein. On the other hand, efforts have been made to describe the important features and details of the structure and operation such that any person having ordinary skill in the art of slipform paving would understand from the discussion herein, together with the drawings, how to make and use the invention. Examples of details of construction omitted from the discussion are: the machine 10 is powered by conventional engine and hydraulic pump means; most hydraulic hoses and electrical wiring lines have been omitted from the drawings; numerous ramps, ladders, guards and railings; the operator's control console; sensing elements that cooperate with conventional hydraulic circuitry, as well as the hydraulic circuitry per se; cowlings; and other such details which are necessary to complete the physical embodiment of machine 10, but which are unnecessary for a full and complete disclosure of the present invention.

It is evident that the present invention achieves the objects of the invention by providing a slipform paving machine having an exceptionally versatile frame assembly that is supported and advanced by new and novel leg and track assemblies that cooperate with a new and novel combination of working implements that results in superior equipment performance while achieving an improved quality of road making.

Changes may be made in the construction and the arrangement of the parts or the elements of the various embodiments, or in the steps of the method as described herein without departing from the spirit and scope of the invention as defined in the following claims.

What is claimed is:

1. A road building machine for forming finished grade concrete roads, comprising:
   a frame assembly;
   slipform means carried by the frame assembly for receiving the concrete and defining the sides of the road;
   spreading means carried by the frame assembly for transversely equalizing the depth of the concrete initially received by the slipform means;
   vibrator means carried by the frame assembly for vibrating and densifying the concrete being spread by the spreading means;
   strike off assembly carried by the frame assembly disposed behind the vibrator means;
   grout screed means carried by the frame assembly behind the strike off assembly for effecting an aggregate density gradient in the concrete; and
   profile pan means connected to the frame assembly and held in spatial relationship therefrom for molding the concrete in cooperation with the slipform means.

2. The road building machine of claim 1 further comprising motive means supporting the frame assembly for propelling the machine.

3. The motive means of claim 2 further comprising:
   a pair of forward leg assemblies pivotally connected to the frame assembly for horizontal pivotation of the forward leg assemblies relative to the frame assembly;
   a pair of forward track assemblies, each of the track assemblies including a vertically extending member, each of the forward track assemblies being pivotally connected to one of the forward leg assemblies at its respective vertically extending member for horizontal pivotation of the forward track assembly relative to its respective forward leg assembly;
   a pair of rear leg assemblies pivotally connected to the frame assembly for horizontal pivotation of the rear leg assemblies relative to the frame assembly; and, a pair of rear track assemblies, each of the rear track assemblies including a vertically extending member, each of the rear track assemblies being pivotally connected to one of the rear leg assemblies at its respective vertically extending member for horizontal pivotation of the rear track assembly relative to its respective rear leg assembly.

4. The motive means of claim 3 comprises power means driving the track assemblies.

5. The road building machine of claim 3 further comprises steering means for directing the machine along a determined path.

6. The road building machine of claim 5 wherein the steering means comprises:
a forward steering means for guiding the forward track assemblies; and,
a rear steering means for guiding rear track assemblies.

7. The road building machine of claim 6 wherein:
the pair of forward track assemblies includes a forward guide track assembly and a forward follower track assembly; and,
the forward steering means includes:
forward first rotating ram means for rotating the forward guide track assembly;
forward second rotating ram means for rotating the forward follower track assembly;
forward first valve means connected to the forward first rotating ram means for selectively actuating the forward first rotating ram means;
forward second valve means connected to the forward second rotating ram means for selectively actuating the forward second rotating ram means;
forward direction selector means connected to the forward first valve means for actuating the forward first valve means to selectively rotate the forward guide track assembly; and,
forward cable means connecting the forward guide track assembly and the forward second valve means for actuating the forward second valve means, thereby actuating the forward second rotating ram means and effecting the rotation of the forward follower track assembly in response to the rotation of the forward guide track assembly.

8. The road building machine of claim 7 wherein:
the pair of rear track assemblies comprises a rear guide track assembly and a rear follower track assembly; and,
the rear steering means comprises:
rear first rotating ram means for rotating the rear guide track assembly;
rear second rotating ram means for rotating the rear follower track assembly;
rear first valve means connected to the rear first rotating ram means for selectively pressurizing the rear first rotating ram means;
rear second valve means connected to the rear second rotating ram means for selectively pressurizing the rear second rotating ram means;
rear direction selector means connected to the rear first valve means for actuating the rear first valve means to selectively rotate the rear guide track assembly; and,
rear cable means connecting the rear guide track assembly and the rear second valve means for actuating the rear second valve means thereby actuating the rear second rotating ram means and effecting the rotation of the rear follower track assembly in response to the rotation of the rear guide track assembly.

9. The road building machine of claim 8 wherein:
the forward first rotating ram means comprises a hydraulic ram having one end thereof connected to the vertical extending member of the forward guide track assembly at a variable position thereon and the other end of the ram connected to the forward leg assembly connected to the forward guide track assembly; and,
the forward second rotating ram means comprises a hydraulic ram having one end thereof connected to the vertical extending member of the forward follower track assembly at a variable position thereon and the other end of the ram connected to the forward leg assembly connected to the forward follower track assembly.

10. The road building machine of claim 9 wherein:
the rear first rotating ram means comprises a hydraulic ram having one end thereof connected to the vertical extending member of the rear guide track assembly at a variable position thereon and the other end of the ram connected to the rear leg assembly connected to the rear guide track assembly; and,
the rear second rotating ram means includes a hydraulic ram having one end thereof connected to the vertical extending member of the rear follower track assembly at a variable position thereon and the other end of the ram connected to the rear leg assembly connected to the rear follower track assembly.

11. The road building machine of claim 10 wherein:
the forward direction selector means comprises:
a forward steering assembly means connectable to the forward first valve means for actuating the forward first valve means in response to a manual input signal to the forward steering assembly means;
forward sensor means sensing an external input signal and connectable to the first valve means for actuating the forward first valve means in response to the external input signal;
forward switching means cooperatively connecting with the forward steering assembly means and the forward sensor means for alternatively connecting the forward steering assembly means to the forward first valve means, and the forward sensor means to the forward first valve means; and,
the rear direction selector means comprises:
a rear steering assembly means connectable to the rear first valve means for actuating the rear first valve means in response to a manual input signal to the rear steering assembly means;
rear sensor means sensing an external input signal and connectable to the rear first valve means for actuating the rear first valve means in response to the external input signal; and,
rear switching means cooperatively connecting the rear steering assembly means and the rear sensor means for alternatively connecting the rear steering assembly means to the rear first valve means, and the rear sensor means to the rear first valve means.

12. The road building machine of claim 11 further comprises:
- forward elevating means for vertically positioning each forward track assembly relative to its respective forward leg assembly; and,
- rear elevating means for vertically positioning each rear track assembly relative to its respective rear leg assembly.

13. The road building machine of claim 12 wherein:
- the forward elevating means comprises a hydraulic ram having one of its ends connected to one of the forward track assemblies and its other end connected to the respective forward leg assembly, and a hydraulic ram having one of its ends connected to the other forward track assembly and its other end connected to the respective forward leg assembly; and,
- the rear elevating means comprises a hydraulic ram having one of its ends connected to one of the rear track assemblies and its other end connected to the respective rear leg assembly, and a hydraulic ram having one of its ends connected to the other rear track assembly and its other end connected to the respective rear leg assembly.

14. The road building machine of claim 12 wherein: the forward elevating means comprises:
- forward elevating ram means connected to the forward leg assemblies and to the forward track assemblies for vertically positioning the forward track assemblies relative to the forward leg assemblies;
- forward elevating valve means connected to the forward elevating ram means for actuating the forward elevating ram means;
- forward elevating selector means connected to the forward elevating valve means for actuating the forward elevating valve means; and, the rear elevating means comprises:
- rear elevating ram means connected to the rear leg assemblies and to the rear track assemblies for vertically positioning the rear track assemblies relative to the rear leg assemblies;
- rear elevating valve means connected to the rear elevating ram means for actuating the rear elevating ram means; and,
- rear elevating selector means connected to the rear elevating valve means for actuating the rear elevating valve means.

15. The road building machine of claim 14 wherein: the forward elevating selector means comprises:
- forward manual elevating means connectable to the forward elevating valve means for actuating the forward elevating valve means in response to a manual input signal to the forward manual elevating means;
- forward elevating sensor means sensing an external input signal and connectable to the forward elevating valve means for actuating the forward elevating valve means in response to the external input signal;
- forward switching means cooperatively connecting with the forward manual elevating means and the forward elevating sensor means for alternatively connecting the forward manual elevating means to the forward elevating valve means and the forward elevating sensor means to the forward elevating valve means; and, the rear elevating selector means comprises:
- rear manual elevating means connectable to the rear elevating valve means for actuating the rear elevating valve means in response to a manual input signal to the rear manual elevating means;
- rear elevating sensor means sensing an external input signal and connectable to the rear elevating valve means for actuating the rear elevating valve means in response to the external input signal; and,
- rear switching means cooperatively connecting with the rear manual elevating means and the rear elevating sensor means for alternatively connecting the rear manual elevating means to the rear elevating valve means and the rear elevating sensor means to the rear elevating valve means.

16. The road building machine of claim 1 wherein: the slipform means further comprises:
- a pair of track shield assemblies carried by the forward track assemblies forming sides cooperating with the ground for initially retaining the concrete; and,
- side forming means carried by the frame for defining and forming the sides of the finished grade road.

17. The road building machine of claim 16 wherein the side forming means comprises:
- a side form frame member pivotally connected to the frame assembly;
- a molding member pivotally connected to the side form frame member;
- means connected to the molding member for applying an adjustable downward force against the molding member whereby the molding member is enabled to pivot relative to the side form frame member in a generally upward direction when the molding member is subjected to a counterforce greater than the downward force applied thereto; and,
- lifting means for rotating the side form frame member relative to the frame assembly.

18. The road building machine of claim 1 wherein the spreading means further comprises:
- a transverse track assembly carried by the frame assembly;
- a spreader frame supported by the track assembly;
- means for reciprocating the spreader frame relative to the track assembly;
- a paddle member; and,
- vertical means connected to the spreader frame for holding the paddle member at an adjustable distance from the spreader frame.

19. The road building machine of claim 18 wherein the vertical means comprises a hydraulic ram having one end connected to the paddle member and its other end connected to the spreader frame, and valve means for extending and contracting the hydraulic ram.

20. The road building machine of claim 18 wherein the paddle member is shaped to have two convergent sides forming a leading edge and forming an acute angle therebetween.

21. The road building machine of claim 1 wherein the vibrator means comprises:
- a transverse vibrator frame;
- a plurality of vibrators connected to the vibrator frame; and,
- vibrator connector means for connecting the vibrator frame to the frame assembly.

22. The road building machine of claim 21 wherein the vibrator connector means comprises a hydraulic ram having one end connected to the vibrator frame and its other end connected to the frame assembly, and valve means for extending and contracting the hydraulic ram.

23. The road building machine of claim 1 wherein the strike off means comprises:
   a strike off blade; and,
   strike off connector means for adjustably connecting the strike off blade to the frame assembly.

24. The road building machine of claim 23 wherein the connector means further comprises a hydraulic ram having one end connected to the strike off blade and its other end connected to the frame assembly, and valve means for extending and contracting the hydraulic ram.

25. The road building machine of claim 1 wherein the grout screed means further comprises:
   a screed member extending transversely to the frame assembly having a plurality of ribs defining plural openings therebetween;
   a hanger assembly connecting the screed member to the frame assembly; and,
   vibrator means for vibrating the screed ribs.

26. The road building machine of claim 1 wherein the profile pan means further comprises:
   a profile pan having a substantial planar area and an upturned front portion; and,
   hanger means for connecting the profile pan to the frame assembly an adjustable distance therefrom and in adjustable angular disposition of the planar area relative to the frame assembly.

27. The road building machine of claim 1 further comprising:
   float pan means pulled by the machine for final surface conditioning of the concrete molded by the profile pan means and the slipform means.

28. The road building machine of claim 27 wherein the float pan means comprises:
   a float pan having a substantial planar area, a front hanger, and a rear hanger, the float pan connected to the profile pan means by the front hanger; and,
   means for connecting the rear hanger of the float pan to the frame assembly at an adjustable distance therefrom.

29. An improved road building machine of the type wherein road working implements are supported over a roadbed and caused to interwork therewith to distribute, condition and form road building material, wherein the improvement comprises:
   a frame assembly supporting the road working implements comprising:
      a center frame; and
      a pair of side members connected to the center frame and selectively extendible an adjustable distance from the center frame;
   a forward first leg assembly connected to one of the side members for horizontal pivotation of the forward first leg assembly relative to the side member;
   a forward second leg assembly connected to the other side member for horizontal pivotation of the forward second leg assembly relative to the other side member;
   a forward guide track assembly having a vertically extending member pivotally connected to the forward first leg assembly, the forward guide track assembly held thereby in adjustable spatial relationship to the forward first leg assembly;
   a forward follower track assembly having a vertically extending member pivotally connected to the forward second leg assembly, the forward follower track assembly held thereby in adjustable spatial relationship to the forward second leg assembly;
   a rear first leg assembly connected to the side member to which the forward first leg assembly is connected, for horizontal pivotation of the rear first leg assembly relative to said side member;
   a rear second leg assembly connected to the other side member for horizontal pivotation of the rear second leg assembly relative to the other side member;
   a rear guide track assembly having a vertically extending member pivotally connected to the rear first leg assembly, the rear guide track assembly held thereby in adjustable spatial relationship to the rear first leg assembly;
   a rear follower track assembly having a vertically extending member pivotally connected to the rear second leg assembly, the rear follower track assembly held thereby in adjustable spatial relationship to the rear second leg assembly; and,
   steering means for directing the machine along a determined path, the steering means characterized as comprising:
      rear steering means guidingly connected to the rear guide track assembly and to the rear follower track assembly for guiding the machine; and,
      forward steering means guidingly connected to the forward guide track assembly and to the forward follower track assembly for guiding the machine, the forward steering means characterized as comprising:
         forward first rotating ram means for rotating the forward guide track assembly;
         forward second rotating ram means for rotating the forward follower track assembly;
         forward first valve means connected to the forward first rotating ram means for selectively actuating the forward first rotating ram means;
         forward second valve means connected to the forward rotating ram means for selectively actuating the forward second rotating ram means;
         forward direction selector means connected to the forward first valve means for actuating the forward first valve means to selectively rotate the forward guide track assembly; and,
         forward cable means connecting the forward guide track assembly and the forward second valve means for actuating the forward second valve means, thereby actuating the second rotating ram means and effecting the rotation of the forward follower track assembly in response to the rotation of the forward guide track assembly.

30. The road building machine of claim 29 wherein the rear steering means comprises:
   rear first rotating ram means for rotating the rear guide track assembly;
   rear second rotating ram means for rotating the rear follower track assembly;
   rear first valve means connected to the rear first rotating ram means for selectively actuating the rear first rotating ram means;
   rear second valve means connected to the rear second rotating ram means for selectively actuating the rear second rotating ram means;
   rear direction selector means connected to the rear first valve means for actuating the rear first valve means to selectively rotate the rear guide track asssembly; and, rear cable means connecting the rear guide track assembly and the rear second valve means for actuating the rear second valve means, thereby actuating the second rotating ram means and effecting the rotation of the rear follower track assembly in response to the rotation of the rear guide track assembly.

31. The road building machine of claim 29 wherein:

the forward first rotating ram means comprises a hydraulic ram having one end thereof connected to the vertical extending member of the forward guide track assembly at a variable position thereon and the other end of the ram connected to the forward first leg assembly connected to the forward guide track assembly; and the forward second rotating ram means comprises a hydraulic ram having one end thereof connected to the vertical extending member of the forward follower track assembly at a variable position thereon and the other end of the ram connected to the forward second leg assembly connected to the forward follower track assembly.

32. The road building machine of claim 30 wherein:

the rear first rotating ram means comprises a hydraulic ram having one end thereof connected to the vertical extending member of the rear guide track assembly at a variable position thereon and the other end of the ram connected to the rear first leg assembly connected to the rear guide track assembly; and, the rear second rotating ram means comprises a hydraulic ram having one end thereof connected to the vertical extending member of the rear follower track assembly at a variable position thereon and the other end of the ram connected to the rear second leg assembly connected to the rear follower track assembly.

33. The road building machine of claim 30 wherein:

the forward direction selector means comprises:
 a forward steering assembly means connectable to the forward first valve means for actuating the forward first valve means in response to a manual input signal to the forward steering assembly means;
 forward sensor means sensing an external input signal and connectable to the first valve means for actuating the forward first valve means in response to the external input signal;
 forward switching means cooperatively connecting with the forward steering assembly means and the forward sensor means for alternatively connecting the forward steering assembly means to the forward first valve means, and the forward sensor means to the forward first valve means; and, the rear direction selector means comprises:
 a rear steering assembly means connectable to the rear first valve means for actuating the rear first valve means in response to a manual input signal to the rear steering assembly means;
 rear sensor means sensing an external input signal and connectable to the rear first valve means for actuating the rear first valve means in response to the external input signal; and,
 rear switching means cooperatively connecting the rear steering assembly means and the rear sensor means for alternatively connecting the rear steering assembly means to the rear first valve means, and the rear sensor means to the rear first valve means.

34. The road building machine of claim 33 further comprising:

forward elevating means for vertically positioning the forward guide track assembly relative to the forward first leg assembly, and for vertically positioning the forward follower track assembly relative to the forward second leg assembly; and, rear elevating means for vertically positioning the rear guide track assembly relative to the rear first leg assembly, and for vertically positioning the rear follower track assembly relative to the rear second leg assembly.

35. The road building machine of claim 34 wherein:

the forward elevating means comprises:
 forward elevating ram means connected to the forward first and second leg assemblies and to the forward guide and follower track assemblies for vertically positioning the forward guide and follower track assemblies relative to the respective forward first and second leg assemblies;
 forward elevating valve means connected to the forward elevating ram means for actuating the forward elevating ram means;
 forward elevating selector means connected to the forward elevating valve means for selectively actuating the forward elevating valve means; and the rear elevating means includes:
 rear elevating ram means connected to the rear first and second leg assemblies and to the rear guide and follower track assemblies for vertically positioning the rear guide and follower track assemblies relative to the respective rear first and second leg assemblies;
 rear elevating valve means connected to the rear elevating ram means for actuating the rear elevating ram means; and,
 rear elevating selector means connected to the rear elevating valve means for selectively actuating the rear elevating valve means.

36. The road building machine of claim 35 wherein:

the forward elevating selector means comprises:
 forward manual elevating means connectable to the forward elevating valve means for actuating the forward elevating valve means in response to a manual input signal to the forward manual elevating means;
 forward elevating sensor means sensing an external input signal and connectable to the forward elevating valve means for actuating the forward elevating valve means in response to the external input signal;
 forward elevating switching means cooperatively connecting with the forward manual elevating means and the forward elevating sensor means for alternatively connecting the forward manual elevating means to the forward elevating valve means and the forward elevating sensor means to the forward elevating valves means; and, the rear elevating selector means comprises:
 rear manual elevating means connectable to the rear elevating valve means for actuating the rear elevating valve means in response to a manual input signal to the rear manual elevating means;

rear elevating sensor means sensing an external input signal and connectable to the rear elevating valve means for actuating the rear elevating valve means in response to the external input signal; and, rear elevating switching means cooperatively connecting with rear manual elevating means and the rear elevating sensor means for alternatively connecting the rear manual elevating means to the rear elevating valve means and the rear elevating sensor means to the rear elevating valve means.

37. The road building machine of claim 36 further comprising:

a pair of track shield assemblies connected to the forward guide and follower track assemblies to form with the roadbed a receiving reservoir for initially receiving the concrete; and, side forming means carried by the frame for defining and forming the sides of the finished grade road.

38. The road building machine of claim 37 further comprising:

a laterally expandable track assembly carried by the frame assembly;

a spreader frame connected to the track assembly;

means for reciprocating the spreader frame on the track assembly relative to the frame assembly;

a paddle member; and, vertical means connecting the paddle member to the spreader frame for holding the paddle member an adjustable distance from the spreader frame.

39. The road building machine of claim 38 wherein the vertical means comprises a hydraulic ram having one end connected to the paddle member and its other end connected to the spreader frame, and valve means for extending and contracting the hydraulic ram.

40. The road building machine of claim 38 wherein the paddle member is shaped to have two convergent sides forming a leading edge and forming an acute angle therebetween.

41. The road building machine of claim 38 further comprising:

a laterally expandable vibrator frame extending transversely to the frame assembly;

a plurality of vibrators connected to the vibrator frame; and, vibrator connecting means for connecting the vibrator frame to the frame assembly.

42. The road building machine of claim 41 wherein the vibrator connecting means comprises a hydraulic ram having one end connected to the vibrator frame and its other end connected to the frame assembly; and valve means for extending and contracting the hydraulic ram.

43. The road building machine of claim 41 further comprising:

a laterally expandable strike off blade extending transversely to the roadbed; and, strike off connector means for adjustably connecting the stike off blade to the frame assembly.

44. The road building machine of claim 43 wherein the strike off connector means comprises a hydraulic ram having one end connected to the strike off blade and its other end connected to the frame assembly, and valve means for extending and contracting the hydraulic ram.

45. The road building machine of claim 43 further comprising:

a laterally expandable screed member extending transversely to the roadbed having a plurality of ribs defining plural openings therebetween;

a hanger assembly connected to the screed member and to the frame assembly; and, vibrator means for vibrating the screed ribs.

46. The road building machine of claim 45 further comprising:

a laterally expandable profile pan having a substantial planar area and an upturned front portion; and, hanger means for connecting the profile pan to the frame assembly in adjustable spatial relationship thereto and in adjustable angular disposition of the planer area relative to the frame assembly.

47. The road building machine of claim 46 further comprising:

a laterally expandable float pan having a substantial planar area, a front hanger, and a rear hanger, the float pan connected to the profile pan by the front hanger;

means for connecting the rear hanger of the float pan to the frame assembly at an adjustable distance therefrom.

48. In combination with a slipform paving machine of the type wherein road working implements including slipforms are carried by a propelled frame assembly over a roadbed for distributing, shaping and forming concrete into a continuous concrete slab, the improvement which comprises:

spreader means for initially spreading the concrete from a bulk form;

vibrator means extending into the concrete for vibrating and densifying the concrete, the vibrator means positioned in close proximity to the spreader means;

strike off blade means located in back of and in close proximity to the vibrator means, a grout screed, having a plurality of ribs defining plural openings therebetween extending into the concrete, the grout screed positioned behind and in close proximity to the strike off blade; and profile pan means positioned behind and in close proximity to the grout screed.

49. The combination claimed in claim 48 wherein: the vibrator means comprises:

a vibrator frame extending transversely to the roadbed;

a plurality of vibrators connected to the vibrator frame;

a vibrator hydraulic ram having one end connected to the vibrator frame and its other end connected to the frame assembly;

valve means for actuating the vibrator hydraulic ram; and, the strike off blade means comprises:

a strike off blade extending transversely to the roadbed;

a strike off hydraulic ram having one end connected to the strike off blade and its other end connected to the frame assembly; and, valve means for actuating the strike off hydraulic ram.

50. The combination claimed in claim 48 further comprising vibrating means for vibrating the ribs of the grout screed.

* * * * *

UNITED STATES PATENT OFFICE
CERTIFICATE OF CORRECTION

Patent No. 3970405                  Dated July 20, 1976

Inventor(s) Swisher, Jr., Smith, Phillips

It is certified that error appears in the above-identified patent and that said Letters Patent are hereby corrected as shown below:

Column 2, line 23

"or" should be --of--.

Column 4, line 29

"29" should be --39--.

Column 6, line 66

"a" should be --an--.

Column 21, line 49

"nd" should be --and--.

Column 22, line 48

"chian" should be --chain--.

Column 29, line 53

"960" should be --970--.

Column 30, line 16

The number "and 946" should be after the number 934.

Column 31, line 65

"110" should be --1100--.
    (Same mistake in column 32, line 1)

Column 38, line 27

"immediatley" should be --immediately--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*